US012508934B2

(12) United States Patent
Ciou

(10) Patent No.: US 12,508,934 B2
(45) Date of Patent: Dec. 30, 2025

(54) METHOD FOR SCHEDULING CHARGING AND DISCHARGING AND CHARGE-DISCHARGE SYSTEM

(71) Applicant: Lite-On Technology Corporation, Taipei (TW)

(72) Inventor: Wei Ciou, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 41 days.

(21) Appl. No.: 18/791,377

(22) Filed: Jul. 31, 2024

(65) Prior Publication Data

US 2025/0303911 A1 Oct. 2, 2025

Related U.S. Application Data

(60) Provisional application No. 63/569,742, filed on Mar. 26, 2024.

(30) Foreign Application Priority Data

Jul. 12, 2024 (CN) .......................... 202410937464.9

(51) Int. Cl.
*B60L 53/64* (2019.01)
*B60L 53/62* (2019.01)
(Continued)

(52) U.S. Cl.
CPC ............... *B60L 53/64* (2019.02); *B60L 53/62* (2019.02); *B60L 53/63* (2019.02); *B60L 53/665* (2019.02);
(Continued)

(58) Field of Classification Search
CPC .......... B60L 53/64; B60L 53/62; B60L 58/12; B60L 53/665; B60L 53/63; B60L 2260/54; B60L 2260/58
(Continued)

(56) References Cited

U.S. PATENT DOCUMENTS 11,932,131 B2 * 3/2024 Ahtikari ................... H02H 3/08
2010/0076825 A1 * 3/2010 Sato ......................... B60L 53/65
705/14.1

(Continued)

FOREIGN PATENT DOCUMENTS

| CN | 112262512 | 1/2021 |
| TW | 202311077 | 3/2023 |
| TW | 202346120 | 12/2023 |

OTHER PUBLICATIONS

"Office Action of Taiwan Counterpart Application", issued on Mar. 17, 2025, p. 1-p. 6.

*Primary Examiner* — Kenneth M Dunne

(74) *Attorney, Agent, or Firm* — JCIPRNET

(57) ABSTRACT

Disclosed is a method for scheduling charging and discharging. The method includes: obtaining vehicle information about multiple electric vehicles, which includes departure time and state of charging with each electric vehicle corresponding to a charge-discharge device; obtaining system information which includes a grid-to-vehicle profit, a vehicle-to-grid profit, and a vehicle-to-vehicle profit; establishing a fitness function according to the vehicle information and the system information; executing a bio-inspired algorithm to determine a charge-discharge operation for each electric vehicle on the corresponding charge-discharge device at each time interval according to the fitness function; and applying the corresponding charge-discharge operation to the corresponding electric vehicle by the charge-discharge devices.

20 Claims, 15 Drawing Sheets

(51) Int. Cl.
  *B60L 53/63* (2019.01)
  *B60L 53/66* (2019.01)
  *B60L 58/12* (2019.01)

(52) U.S. Cl.
  CPC ........... *B60L 58/12* (2019.02); *B60L 2260/54* (2013.01); *B60L 2260/58* (2013.01)

(58) Field of Classification Search
  USPC ............................................................ 701/9
  See application file for complete search history.

(56) References Cited

U.S. PATENT DOCUMENTS

| | | |
|---|---|---|
| 2017/0337646 A1 | 11/2017 | Zhou et al. |
| 2021/0086647 A1* | 3/2021 | Kiessling ............... B60L 53/665 |
| 2021/0221247 A1* | 7/2021 | Daniel .................... H02J 3/144 |
| 2021/0276447 A1* | 9/2021 | Kumar .................... B60L 53/66 |
| 2023/0191931 A1 | 6/2023 | Maeda et al. |
| 2024/0235205 A1* | 7/2024 | Yin ......................... B60L 53/64 |
| 2024/0391346 A1* | 11/2024 | McCloskey ........... H04L 63/083 |
| 2025/0214473 A1* | 7/2025 | Nabizada ................ B60L 53/53 |

\* cited by examiner

| 1300 | | $P_1$ | $P_2$ | $P_1 \times P_2$ | Additional calculation |
|---|---|---|---|---|---|
| Scenario 1 | Penalty | ✗ | ✗ | $1 \times 1 = 1$ | |
| | Value | 1 | 1 | | |
| Scenario 2 | Penalty | ✗ | ✓ | $1 \times (-M) = -M$ | |
| | Value | 1 | <0 | | |
| Scenario 3 | Penalty | ✓ | ✗ | $N \times (-1) = -N$ | $P_2 = \begin{cases} -1 \; if \; P_1 > 1 \; and \; P_2 = 1 \\ P_2 \; otherwise \end{cases}$ |
| | Value | >1 | -1 | | |
| Scenario 4 | Penalty | ✓ | ✓ | $N \times (-M) = -N \times M$ | |
| | Value | >1 | <0 | | | concentrate : N>0, M>0

FIG. 13

| | Variable $\delta$ | Weight $W$ | Importance $I$ |
|---|---|---|---|
| $g2v\,\rho_t$ | 1 | 1 | $I\_g2v$ |
| $v2g\,\rho_t$ | 1 | $\dfrac{(\rho_t^{v2g} - \rho_t^{g2v})}{10}$ | $I\_v2g$ |
| $v2a\,\rho_t$ | −1 | $\rho_t^{v2g}$ | $I\_v2g$ |

FIG. 14

METHOD FOR SCHEDULING CHARGING AND DISCHARGING AND CHARGE-DISCHARGE SYSTEM

CROSS-REFERENCE TO RELATED APPLICATION

This application claims the priority benefits of U.S. provisional application Ser. No. 63/569,742, filed on Mar. 26, 2024 and China application serial no. 202410937464.9, filed on Jul. 12, 2024. The entirety of each of the above-mentioned patent applications is hereby incorporated by reference herein and made a part of this specification.

BACKGROUND

Technical Field

The disclosure relates to a method for scheduling charging and discharging and a charge-discharge system, which can calculate the charge-discharge operation of an electric vehicle at each time interval according to a bio-inspired algorithm.

Description of Related Art

EV charging stations are facilities that provide electric energy to charge electric vehicles. Charging stations are usually composed of multiple charging piles, each of which may charge an electric vehicle. Charging stations may be deployed in different locations such as homes, public places, office areas, and highway service areas. The charging station may provide one or more charging patterns, including fast charging, slow charging, or two-way charging. Two-way charging technology allows the electric vehicle to obtain electric energy (charging) from the grid and transport the power in the battery back to the grid (discharging). This technology has great significance for electric power load balancing and new energy management. However, when performing two-way charging, the user needs to consider electricity price fluctuations, battery capacity of all electric vehicles, user needs, and other information. Therefore, the industry needs a method for scheduling charging and discharging that takes into account multiple factors.

SUMMARY

In order to solve the aforementioned problems, the disclosure proposes a method for scheduling charging and discharging and a charge-discharge system, which can use a bio-inspired algorithm to determine whether each electric vehicle should be charged, discharged, or maintained unchanged within a period of time.

Embodiments of the disclosure provide a method for scheduling charging and discharging for a charge-discharge system. The charge-discharge system is electrically connected to a grid. The charge-discharge system includes multiple charge-discharge devices. The method for scheduling charging and discharging includes the following steps. Vehicle information about multiple electric vehicles is obtained, where the vehicle information includes a departure time and a state of charging, and each of the electric vehicles corresponds to one of the charge-discharge devices. System information about the charge-discharge system is obtained, where the system information includes multiple profits, and the profits include a grid-to-vehicle profit, a vehicle-to-grid profit, and a vehicle-to-vehicle profit. A fitness function is established according to the vehicle information and the system information. A bio-inspired algorithm is executed to determine a charge-discharge operation for each of the electric vehicles on a corresponding charge-discharge device at each of multiple time intervals according to the fitness function. A corresponding charge-discharge operation is applied to a corresponding electric vehicle by the charge-discharge devices.

In some embodiments, the aforementioned system information further includes a total power capacity. The method for scheduling charging and discharging further includes in the following steps. In a first pattern, the total power capacity is maintained unchanged when one of the electric vehicles is discharged. In a second pattern, the total power capacity is increased when one of the electric vehicles is discharged.

In some embodiments, the step of executing the bio-inspired algorithm according to the fitness function includes: performing an initialization to generate multiple individuals, where each of the individuals includes multiple charge-discharge operations of the electric vehicles on the corresponding charge-discharge devices at the time intervals; calculating a fitness of each of the individuals according to the fitness function; selecting multiple first individuals from the individuals according to the fitness; performing a recombination procedure and a mutation procedure on the first individuals to generate multiple offspring individuals; and adjusting the offspring individuals according to the system information and the vehicle information, and deleting at least one of the adjusted offspring individuals to proceed a next iteration according to multiple conditions.

In some embodiments, the step of performing the initialization to generate the individuals includes: generating multiple combinations for the electric vehicles; and determining the charge-discharge operations of the electric vehicles on the corresponding charge-discharge devices at the time intervals according to a corresponding vehicle order, for each of the combinations, where each of the electric vehicles is in first order in one of the combinations.

In some embodiments, the aforementioned vehicle information further includes an arrival time. The step of establishing the fitness function according to the vehicle information and the system information includes: calculating a charge amount according to the state of charging of the electric vehicles at a corresponding arrival time and the state of charging of the charge-discharge operations at the time intervals; calculating a demand electric power according to the state of charging, an expected departure power, and a battery capacity of the electric vehicles at the corresponding arrival time; calculating a satisfaction according to the charge amount and the demand electric power; adding up the profits at the time intervals to obtain a total profit; and establishing the fitness function according to the satisfaction and the total profit.

In some embodiments, the step of establishing the fitness function according to the vehicle information and the system information further includes: setting the fitness function to a first fitness function at least one of previous time intervals of the time intervals if a profit per unit of electric power under a grid-to-vehicle transmission pattern increases over time and the total power capacity decreases over time, and setting the fitness function to a second fitness function at rest time intervals of the time intervals, where the first fitness function includes a motivation factor more than the second fitness function.

In some embodiments, the aforementioned fitness function includes a first penalty factor. The method for scheduling charging and discharging further includes: setting the first penalty factor to reduce the calculated fitness according to the fitness function if the charge-discharge operation of one of the electric vehicles at least one of last time intervals of the time intervals is discharging.

In some embodiments, the aforementioned fitness function includes a second penalty factor. The method for scheduling charging and discharging further includes: setting the second penalty factor to reduce the calculated fitness according to the fitness function if the state of charging of one of the electric vehicles at the departure time is lower than the state of charging at the arrival time.

In some embodiments, the aforementioned total profit further includes an importance. The method for scheduling charging and discharging further includes: setting the importance to decrease monotonically with a stay time of the electric vehicles in the charge-discharge system.

In some embodiments, the aforementioned total profit further includes a weight. The method for scheduling charging and discharging further includes: setting the weight to a constant when the grid-to-vehicle profit is calculated; setting the weight to be positively related to a difference value between a profit per unit of electric power under a vehicle-to-grid transmission pattern and a profit per unit of electric power under a grid-to-vehicle transmission pattern when the vehicle-to-grid profit is calculated; and setting the weight to be positively related to the profit per unit of electric power under the vehicle-to-grid transmission pattern when the vehicle-to-vehicle profit is calculated.

From another perspective, embodiments of the disclosure provide a charge-discharge system which is electrically connected to a grid. The charge-discharge system includes multiple charge-discharge devices and a charge-discharge controller which is electrically connected to the charge-discharge devices and configured to execute multiple steps. Vehicle information about multiple electric vehicles is obtained, where the vehicle information includes a departure time and a state of charging, and each of the electric vehicles corresponds to one of the charge-discharge devices. System information about the charge-discharge system is obtained, where the system information includes multiple profits, and the profits include a grid-to-vehicle profit, a vehicle-to-grid profit, and a vehicle-to-vehicle profit. A fitness function is established according to the vehicle information and the system information. A bio-inspired algorithm is executed to determine a charge-discharge operation for each of the electric vehicles on a corresponding charge-discharge device at each of multiple time intervals according to the fitness function. A corresponding charge-discharge operation is applied to a corresponding electric vehicle by the charge-discharge devices.

From another perspective, embodiments of the disclosure provide a method for scheduling charging and discharging for a charge-discharge system. The charge-discharge system is electrically connected to a grid. The charge-discharge system includes multiple charge-discharge devices. The method for scheduling charging and discharging includes the following steps. Vehicle information about multiple electric vehicles is obtained. A system information about the charge-discharge system is obtained. A charge-discharge schedule is generated according to the vehicle information and the system information. The charge-discharge schedule is regenerated when the vehicle information or the system information are changed.

In some embodiments, the vehicle information includes types of the electric vehicles, a demand value of a state of charging, or an estimated stay time.

In some embodiments, the system information includes a grid-to-vehicle profit, a vehicle-to-grid profit, a vehicle-to-vehicle profit, and a total power capacity.

In order to make the aforementioned features and advantages of the disclosure comprehensible, embodiments are given below and described in detail with reference to the accompanying drawings.

BRIEF DESCRIPTION OF THE DRAWINGS

FIG. 13 is an adjustment table of the first penalty term and the second penalty term according to an embodiment of the disclosure.

FIG. 14 is a table of weight and importance in calculating each profit according to an embodiment of the disclosure.

DESCRIPTION OF THE EMBODIMENTS

Figure 1:
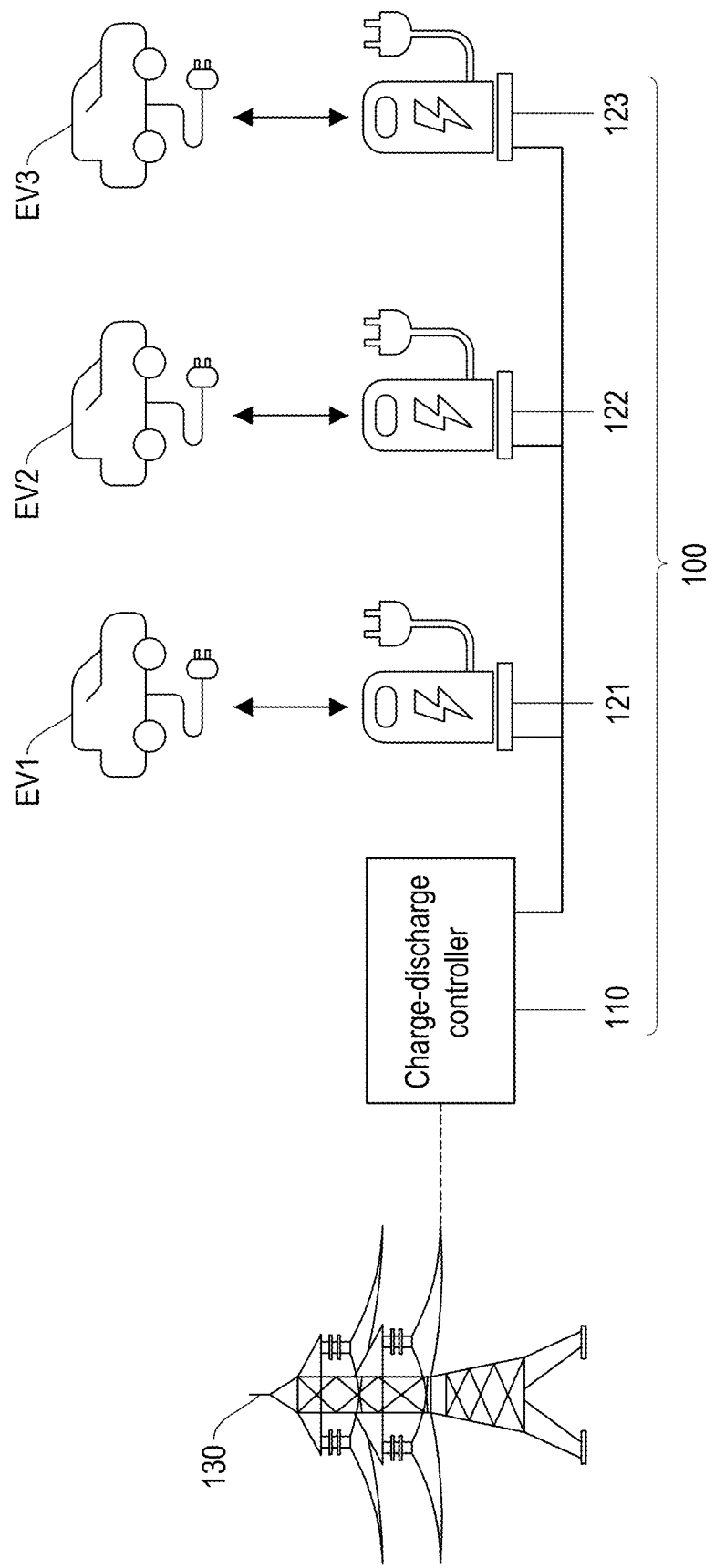
FIG. 1 is a schematic diagram of a charge-discharge system according to an embodiment of the disclosure.

Some embodiments of the disclosure are described in detail with reference to the accompanying drawings. The reference numerals cited in the following description are regarded as the same or similar elements when the same reference numerals appear in different drawings. These embodiments are only part of the disclosure and do not disclose all possible implementations of the disclosure. Rather, these embodiments are merely examples of systems and methods within the scope of the disclosure.

The terms "first", "second", etc. used in the description do not specifically refer to the sequence or ranking, but are only used to distinguish elements or operations described with the same technical terms.

FIG. 1 is a schematic diagram of a charge-discharge system according to an embodiment of the disclosure. Referring to FIG. 1, a charge-discharge system 100 includes a charge-discharge controller 110 and multiple charge-discharge devices 121 to 123. The charge-discharge system 100 is also called a charging station. The charge-discharge system 100 is electrically connected to a grid 130. The charge-discharge controller 110 is electrically connected to the charge-discharge devices 121 to 123, and the charge-discharge devices 121 to 123 correspond to the electric vehicles EV1 to EV3 respectively. The charge-discharge controller 110 may include a processor, a controller, an AC to DC converter, or a transformer, etc., which is not limited by the disclosure. In this embodiment, the charge-discharge devices 121 to 123 are charging piles. Each charging pile may be a DC charging pile or an AC charging pile. In other embodiments, the charge-discharge devices 121 to 123 may perform wireless charging and may be provided with induction coils. The electric vehicles EV1 to EV3 may include cars, trucks, electric motorcycles, or other vehicles driven by electric power.

The type of the electric vehicles EV1 to EV3 may be a one-way charging type or a two-way charging type. If the type of the electric vehicles EV1 to EV3 is the one-way charging type, the charge-discharge devices 121 to 123 provide electric power to the electric vehicles EV1 to EV3. If the type of the electric vehicles EV1 to EV3 is the two-way charging type, the electric vehicles EV1 to EV3 may also discharge to provide electric power in addition to the charge-discharge devices 121 to 123 providing electric power to the electric vehicles EV1 to EV3. In this embodiment, there are three electric power transmission patterns, namely grid to vehicle (G2V), vehicle to grid (V2G), and vehicle to vehicle (V2V).

Regarding the G2V transmission pattern, the grid 130 provides electric power to the charge-discharge controller 110, and then the electric power is transmitted to one of the charge-discharge devices 121 to 123, and transmitted to a corresponding electric vehicle. Regarding the V2G transmission pattern, the electric vehicles EV1 to EV3 discharge, provide electric power to the charge-discharge controller 110, and then transmit the electric power to the grid 130. Regarding the V2V transmission pattern, one of the electric vehicles EV1 to EV3 discharges and provides electric power to the other electric vehicle.

Figure 2:
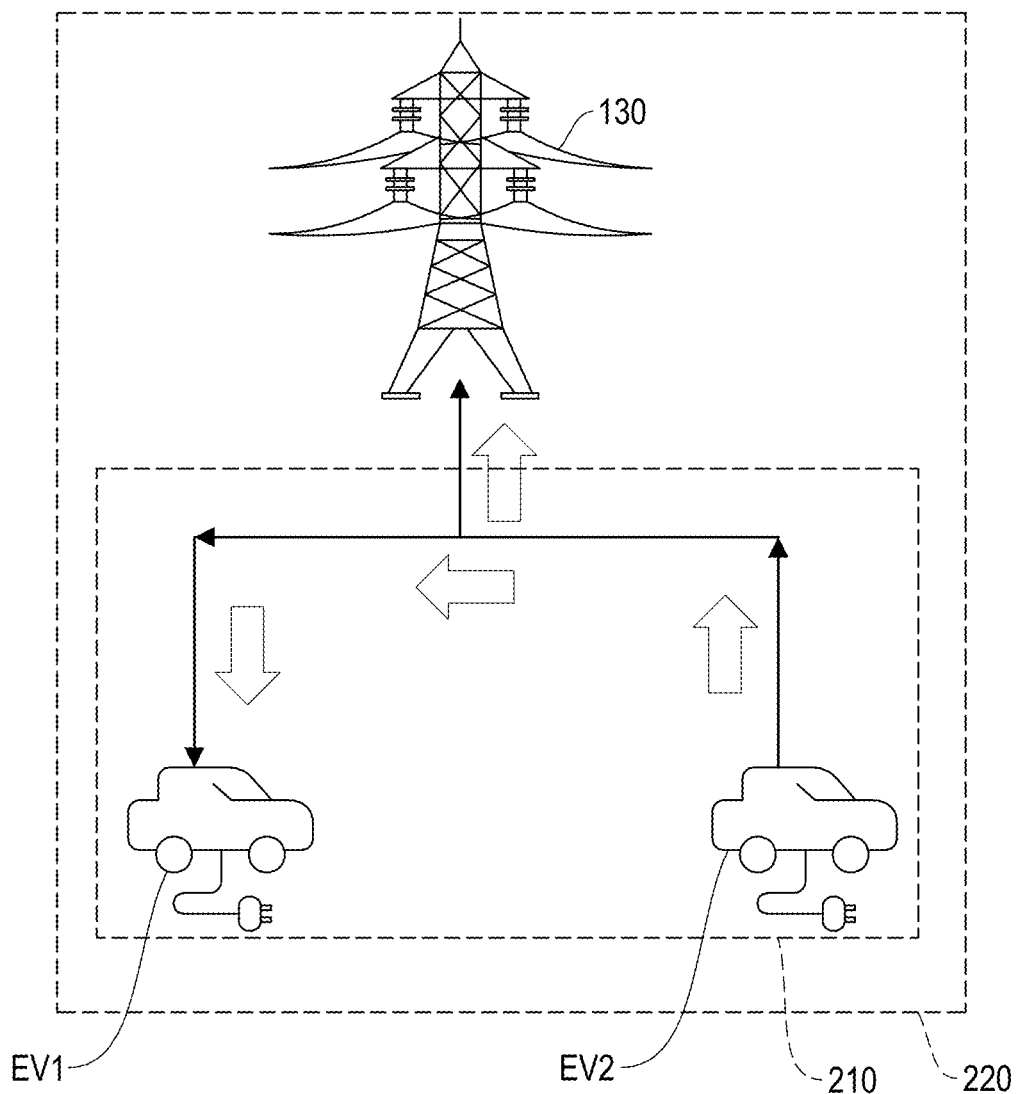
FIG. 2 is a schematic diagram of the priority order of a V2V transmission pattern and a V2G transmission pattern according to an embodiment of the disclosure.

FIG. 2 is a schematic diagram of the priority order of a V2V transmission pattern and a V2G transmission pattern according to an embodiment of the disclosure. If the electric vehicle is charged and the other electric vehicle is discharged at the same time, the released electric power is given priority to the charging electric vehicle. A surplus of electric power is sold to the gird 130 only if the need of the electric vehicle is met. For example, in the example of FIG. 2, the electric vehicle EV1 is charged, while the electric vehicle EV2 is discharged. Therefore, the electric power released by the electric vehicle EV2 is provided to the electric vehicle EV1 first, and the surplus of electric power is sold to the grid 130. In other words, the V2V transmission pattern 210 takes precedence over the V2G transmission pattern 220. If the electric power released by the electric vehicle EV2 is not enough to meet the need of the electric vehicle EV1, the grid 130 may provide electric power to charge the electric vehicle EV1.

Figure 3:
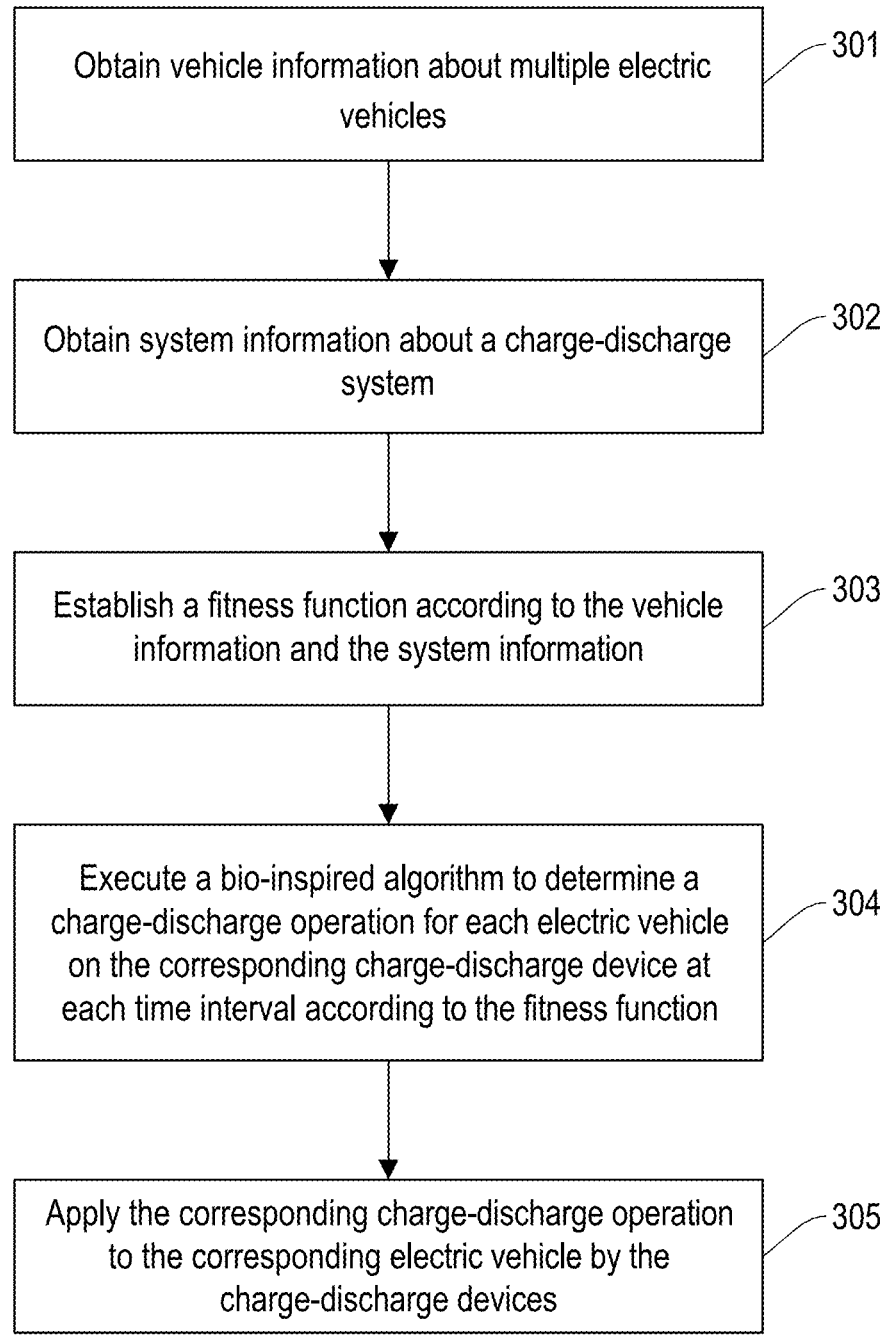
FIG. 3 is a flowchart of a method for scheduling charging and discharging according to an embodiment of the disclosure.

FIG. 3 is a flowchart of a method for scheduling charging and discharging according to an embodiment of the disclosure. Referring to FIG. 3, the method is executed by the charge-discharge controller 110, and is not repeated below. First, in step 301, vehicle information about multiple electric vehicles EV1 to EV3 is obtained. The vehicle information includes the arrival time of each electric vehicle entering the charging station, the departure time of each electric vehicle leaving the charging station, and the type (the one-way charging type or the two-way charging type) of the electric vehicle, the state of charging (also called the stage of charging (SOC)) when each electric vehicle entering the charging station, which charge device the electric vehicle is parked at, the battery capacity of the electric vehicle, etc. The estimated stay time of the electric vehicle at the charging station may be calculated according to the arrival time and the departure time.

During simulation, the aforementioned vehicle information may be obtained according to historical data. When applied in practice, the vehicle information at future time points may be predicted according to the historical data. For example, if a charging station is set up near the workplace, more electric vehicles may enter the station during working hours or noon, and then leave the station at off-duty time. After enough historical data is collected, the vehicle information in the future may be predicted according to statistical models or machine learning models.

In step 302, system information about the charge-discharge system 100 is obtained. The system information includes the total power capacity of the charge-discharge system 100, the profits of various electric power transmission patterns, the specifications of each of the charge-discharge devices 121 to 123, the feedback profits from consumers providing electric power, etc. The total power capacity represents the maximum power that the charge-discharge system 100 may provide. The specifications of the charge-discharge devices 121 to 123 include AC or DC, conversion efficiency of electric power, charge/discharge power, etc. For example, when the charge-discharge device provides AC, the power is in a range of 1.4 to 7 kilowatts (kW), and when the charge-discharge device provides DC, the power is in a range of 5 to 50 KW. Each electric power transmission pattern has its own profit, which includes a grid-to-vehicle profit, a vehicle-to-grid profit, and a vehicle-to-vehicle profit.

The grid-to-vehicle profit is equal to the price at which the charge-discharge system 100 sells electricity to the user (providing electric power to electric vehicles) minus the price at which the charge-discharge system 100 and the grid 130 purchase electricity. The grid-to-vehicle profit changes over time. There are different profits at different times within 24 hours a day, but this profit is generally a positive number.

The vehicle-to-grid profit is equal to the price at which the grid 130 and the charge-discharge system 100 purchase electricity minus the price at which the charge-discharge system 100 and the user purchase electricity (electric power provided by the electric vehicle). The vehicle-to-grid profit also changes over time. There are different profits at different times within 24 hours a day. This profit may be a positive number or a negative number.

The vehicle-to-vehicle profit is equal to the price at which the charge-discharge system 100 sells electricity to the user minus the price at which the charge-discharge system 100 purchases electricity from another user. The price at which the charge-discharge system 100 and the user purchase electricity must be greater than the price at which the charge-discharge system 100 sells electricity to the user. The difference between the two is the aforementioned feedback profit from consumers providing electric power. It is assume that the feedback profit is 10%, and the price of electricity sold by the charge-discharge system 100 to the user is x dollar, then the price of electricity purchased by the charge-discharge system 100 and the user is 1.1x dollar. Therefore, the vehicle-to-vehicle profit within 24 hours a day remains constant and must be a negative number.

Figure 4:
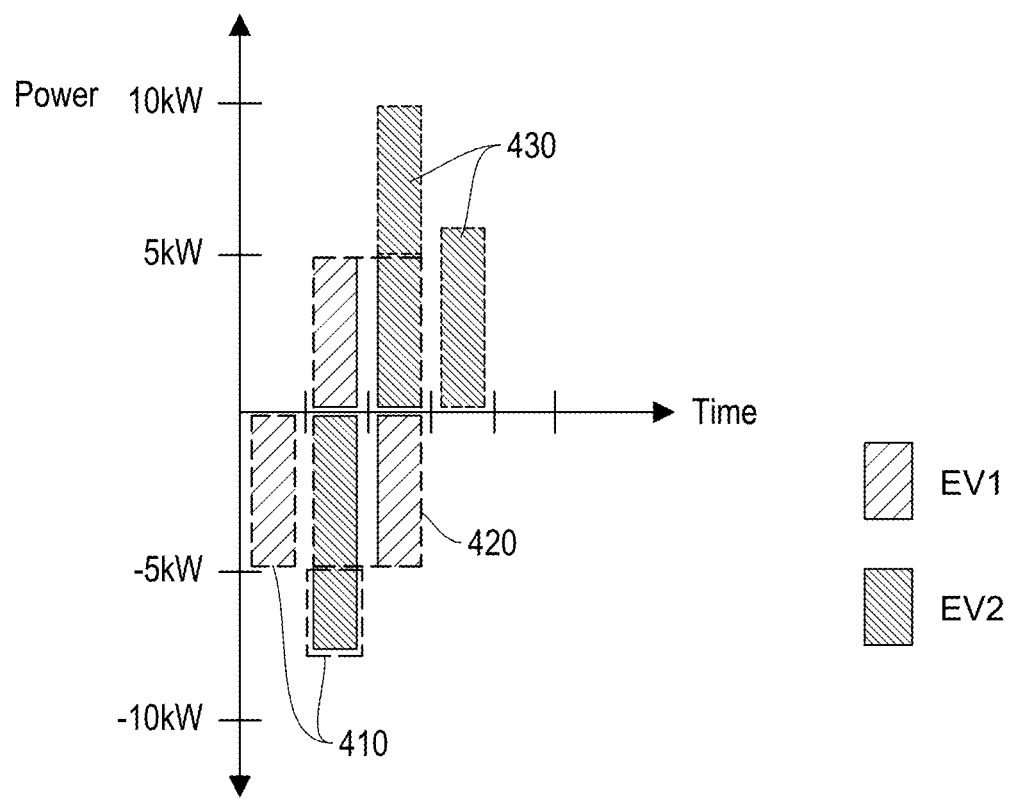
FIG. 4 is a schematic diagram of scheduling results according to an embodiment of the disclosure.

FIG. 4 is a schematic diagram of scheduling results according to an embodiment of the disclosure Referring to FIG. 4, a horizontal axis is time, a vertical axis is power, and different long bars represent different electric vehicles. When the power is less than 0, the electric vehicle is discharged. When the power is greater than 0, the electric vehicle is charged. Multiple time intervals are set here. The time interval is, for example, 15 minutes. At each time interval, the electric vehicle maintains the charging or discharging state, but the charging or discharging state may be changed at the next time interval. For example, at the first time interval, the electric vehicle EV1 is discharged. At the second time interval, the electric vehicle EV1 is charged, while the electric vehicle EV2 is discharged. At the third time interval, the electric vehicle EV1 is discharged and the electric vehicle EV2 is charged. At the fourth time interval, the electric vehicle EV2 is charged.

A long bar portion 410 refers to the V2G transmission pattern, a long bar portion 420 refers to the V2V transmission pattern, and a long bar portion 430 refers to the G2V transmission pattern. Specifically, the calculation of G2V profit is as shown in the following Mathematical Formula 1.

[Mathematical Formula 1]

$$g2v\rho = \sum_{t=1}^{n}\left\{\max\left[\sum_{ev=1}^{m}\max(\mathbb{P}_{t,ev}, 0) + \left(\sum_{ev=1}^{m}\min(\mathbb{P}_{t,ev}, 0)\times E\right), 0\right]\right\} \times \Delta t \times \overline{\rho_t^{g2v}}$$

In Mathematical Formula 1, g2v $\rho$ is the accumulated grid-to-vehicle profit over a period of time, t represents time, n is the total length of time, n=4 in the example of FIG. 4, ev represents a corresponding electric vehicle, m represents the total number of all electric vehicles, and $\mathbb{P}_{t, ev}$ represents the electric power to be converted for the electric vehicle ev at time t. When $\mathbb{P}_{t, ev}$ is greater than 0, the electric vehicle is charged. When $\mathbb{P}_{t, ev}$ is less than 0, the electric vehicle is discharged. E is the conversion efficiency of electric power, for example, 0.96. There is energy loss from the electric vehicle to another device, but the profit is calculated according to how much power received by the other device, and therefore must be multiplied by the conversion efficiency when the electric vehicle is discharged. In the aforementioned Mathematical Formula 1, max($\mathbb{P}_{t, ev}$, 0) calculates the charged electric power, and min($\mathbb{P}_{t, ev}$, 0)×E calculates the discharged electric power. After adding all the charged electric power to all the discharged electric power (the negative number), a value may be obtained. If the value is greater than 0, the electric power (shown as the long bar portion 430) must be obtained from the grid. If the value is less than 0, no electric power is obtained from the grid. $\Delta t$ is the time interval, for example, 15/60. $\overline{\rho_t^{g2v}}$ is the profit per unit of electric power under the G2V transmission pattern. the electric power obtained from the grid is multiplied by $\Delta t$ and $\overline{\rho_t^{g2v}}$, the time t is added, and the grid-to-vehicle profit g2v $\rho$ is obtained.

The calculation of the vehicle-to-grid profit is shown in the following Mathematical Formula 2.

[Mathematical Formula 2]

$$v2g\rho = \sum_{t=1}^{n}\left\{\max\left[\sum_{ev=1}^{m}\min(\mathbb{P}_{t,ev}, 0)\times E\times(-1)\right] - \sum_{ev=1}^{m}\max(\mathbb{P}_{t,ev}, 0), 0\right]\right\}\times$$

$$\Delta t \times \overline{\rho_t^{v2g}}$$

v2g $\rho$ is the accumulated vehicle-to-grid profit over a period of time. In Mathematical Formula 2, all the discharged electric power is multiplied by −1 to take a positive number, and all the charged electric power is subtracted. If there is any surplus of electric power (greater than 0), the electric power is sold to the grid, shown as the long bar portion 410 in FIG. 4. $\overline{\rho_t^{v2g}}$ is the profit per unit of electric power under the V2G transmission pattern. All the electric power sold to the grid is multiplied by $\Delta t$ and $\overline{\rho_t^{v2g}}$, the time t is added, and the grid-to-vehicle profit v2g $\rho$ is obtained.

The calculation of V2V profit is shown in the following Mathematical Formula 3.

[Mathematical Formula 3]

$$v2v\rho = \sum_{t=1}^{n}\left\{\left[\sum_{ev=1}^{m}\max(\mathbb{P}_{t,ev}, 0)\right] - g2v\_power\right\}\times \Delta t\times \overline{\rho_t^{v2v}}$$

$$g2v\_power = \max\left[\sum_{ev=1}^{m}\max(\mathbb{P}_{t,ev}, 0) + \left(\sum_{ev=1}^{m}\min(\mathbb{P}_{t,ev}, 0)\times E\right), 0\right]$$

In Mathematical Formula 3, all the charged electric power is subtracted the electric power (that is, g2v_power) inflowing from the grid to obtain a difference value. If the difference value is equal to 0, the grid may meet all charging needs. If the difference value is greater than 0, the grid may not meet all charging needs, which is equivalent to the V2V transmission pattern (shown as the long bar portion 420 in FIG. 4, which corresponds to the upper half since only the charging portion is calculated). Similarly, $\overline{\rho_t^{v2v}}$ is the profit per unit of electric power under the V2V transmission pattern. The electric power under the V2V transmission pattern is multiplied by $\Delta t$ and $\overline{\rho_t^{v2v}}$, the time t is added, and the vehicle-to-vehicle profit v2v $\rho$ is obtained.

Referring back to FIG. 3, in step 303, a fitness function is established according to the vehicle information and the system information. According to the vehicle information, a determination whether the electric vehicle of the user has received the required power may be made, and the user satisfaction may be calculated. In another aspect, various profits may be calculated according to the system information. The user satisfaction and the profit are added together to create the fitness function.

For example, a charge amount may be calculated according to the state of charging of the electric vehicle at the arrival time and the charge-discharge operation at all time intervals. Specifically, the total charge amount (or the total discharge amount) may be obtained by accumulating the charge-discharge operation at all time intervals. The total charge amount (or the total discharge amount) is added to the state of charging at the arrival time may obtain the charge amount at the departure time. It is assumed that the state of charging at the departure time is $SOC_{final}$, and the state of charging at the arrival time is $SOC_{start}$, the charge amount is $(SOC_{final} - SOC_{start})*C$, where C is the battery capacity of the electric vehicle. In another aspect, that the state of charging of the electric vehicle at the departure time must reach a preset value (for example, 80%, also called the expected state of charging at the departure time) may be set. According to the state of charging of the electric vehicle at the arrival time, the expected state of charging of the electric vehicle at the departure time, the battery capacity may be used to calculate the demand electric power, which is also called the demand value of state of charging. It is assumed that the expected power of the electric vehicle at the departure time is expressed as $SOC_{expect}$, the expected power of the electric vehicle at the arrival time subtracted from the state of charging of the electric vehicle at the arrival time may obtain a difference value $SOC_{expect}-SOC_{start}$. The difference value is multiplied by the battery capacity C to obtain the demand electric power. In some embodiments, since there are losses in the electric power transmission process, the demand electric power may also be divided by the aforementioned conversion efficiency E. Next, a corresponding satisfaction may be calculated according to the charge amount and the demand electric power. For example, the aforementioned charge amount divided by the demand electric power may be used as the user satisfaction, and the calculation is in the following Mathematical Formula 4.

[Mathematical formula 4]

Satisfaction = Change amount/Demand electric power

In other embodiments, the difference value between the charge amount and the demand electric power may also be calculated to calculate satisfaction. Alternatively, if it is assumed that the relationship between the charge amount and the satisfaction is non-linear, the charge amount and the demand electric power may also be substituted into a non-linear equation to calculate the satisfaction. The non-linear equation may be an exponential function, a logarithmic function, etc., which is not limited by the disclosure. In this embodiment, the unit of the charge amount and the demand electric power is degree (kilowatt-hour), but in other embodiments the unit may also be percentage. In other embodiments, the expected power of the electric vehicle at the departure time may also be dynamically adjusted according to electricity price, time, or location, or may also be set by the user, which is not limited by the disclosure.

In another aspect, all the profits at all time intervals are added to obtain a total profit. For example, the aforementioned Mathematical Formulas 1 to 3 are added together to obtain the total profit. Finally, a fitness function may be established according to the calculation of the satisfaction and the total profit. For example, a weight may be set for the satisfaction and the total profit respectively, and then a weight sum of the satisfaction and the total profit may be calculated as the fitness function. In some embodiments, non-linear operations such as squaring or rooting the satisfaction or the total profit may also be added up to obtain the fitness function. Persons with ordinary knowledge in the art may design a fitness function according to the aforementioned disclosure.

In step 304, a bio-inspired algorithm is executed to determine a charge-discharge operation of each electric vehicle on a corresponding charge-discharge device at each time interval according to the fitness function. The charge-discharge operation may be expressed as $\mathbb{P}_{t,\ ev}$ in the aforementioned Mathematical Formulas 1 to 3. In other words, the charge-discharge operation may be charging ($\mathbb{P}_{t,\ ev}>0$), discharging ($\mathbb{P}_{t,\ ev}<0$), or maintaining unchanged ($\mathbb{P}_{t,\ ev}=0$). In addition, the charge-discharge operation also includes the power to be converted ($|\mathbb{P}_{t,\ ev}|$).

The aforementioned bio-inspired algorithm may include a genetic algorithm (GA), an evolution strategy (ES), a neuroevolution, a particle swarm optimization (PSO), an ant colony optimization (ACO), etc. These algorithms generate multiple candidate solutions, select the candidate solutions according to the fitness function, and generate the candidate solutions for the next iteration by different strategies according to different algorithms. After multiple iterations, an optimal solution is found. In other words, the aforementioned algorithm finds the $\mathbb{P}_{t,\ ev}$ for all time and electric vehicles, so that the aforementioned fitness function has an extreme value. This extreme value may be the maximum value or the minimum value according to the design of the fitness function. In this way, the user satisfaction and the profit may be maximized.

In some embodiments, the bio-inspired algorithm may be executed at intervals, such as every 15 minutes. In some embodiments, the bio-inspired algorithm may also be re-executed when the vehicle information or the system information is updated. For example, the bio-inspired algorithm may be re-executed when a new electric vehicle enters the charge-discharge system. However, the disclosure does not limit the timing and the frequency of executing the bio-inspired algorithm.

When the aforementioned bio-inspired algorithm is executed, each candidate solution must meet multiple conditions. The conditions are set out according to the vehicle information and the system information because the charge-discharge operation in each solution may not violate the specifications of the vehicle and the system. For example, if the electric vehicle is the one-way charging type, the electric vehicle may not be discharged, and a corresponding $\mathbb{P}_{t,\ ev}$ must be greater than 0. The converted power ($|\mathbb{P}_{t,\ ev}|$) must comply with the specifications of the electric vehicle and the charge-discharge device, and may not exceed the specified maximum value or be less than the minimum value. In addition, the condition may also be set out that the state of charging may not be lower than a preset value (for example, 20, 40, or 60%) when the electric vehicle is discharged, The power obtained from the grid 130 may not exceed the total power capacity which may change over time.

In step 305, the charge-discharge controller 110 applies corresponding charge-discharge operations to a corresponding electric vehicles EV1 to EV3 by the charge-discharge devices 121 to 123. For example, when $\mathbb{P}_{t,\ ev}>0$, the electric vehicle is charged, when $\mathbb{P}_{t,\ ev}<0$, the electric vehicle is discharged, and when $\mathbb{P}_{t,\ ev}=0$, the electric vehicle maintains unchanged.

Figure 5:
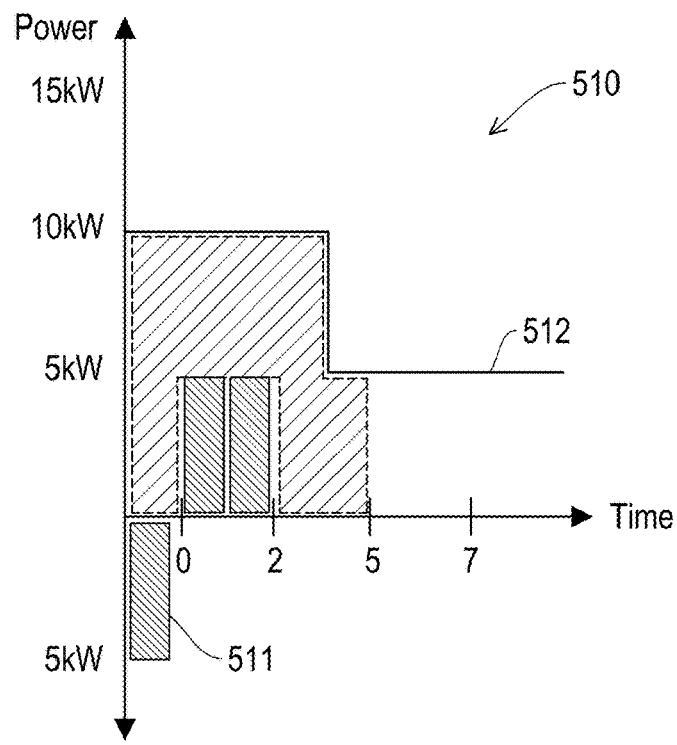
FIG. 5 is a schematic diagram of two patterns according to an embodiment of the disclosure.
Figure 5:
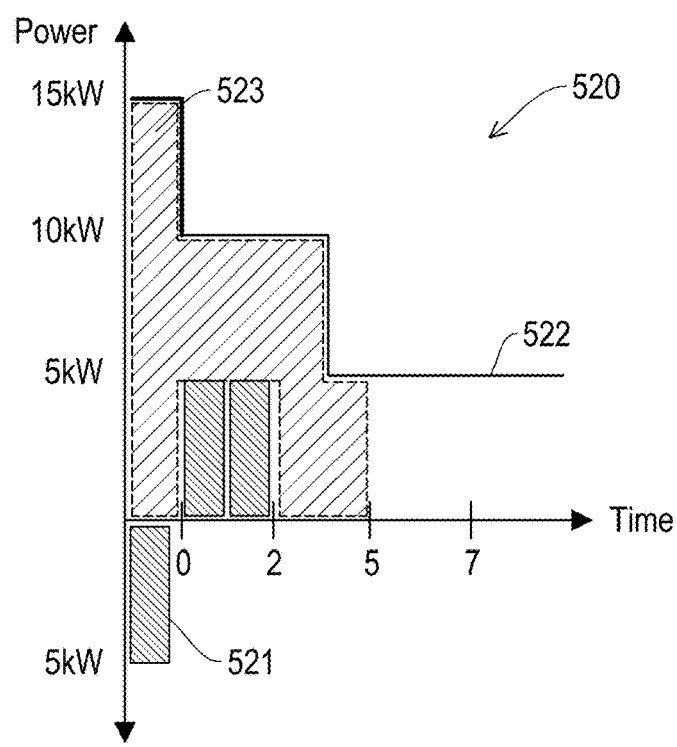

FIG. 5 is a schematic diagram of two patterns according to an embodiment of the disclosure. Referring to FIG. 5, in this embodiment, there are two patterns for charging and discharging. In the first pattern 510, when the electric vehicle is discharged, the total power capacity is maintained unchanged. For example, a plot 512 in FIG. 5 represents the total power capacity. In the first four time intervals, the total power capacity is maintained at 10 kW. After the fifth time interval, the total power capacity is reduced to 5 kW. In the first time interval, the electric vehicle is discharged (a long bar portion 511), and the total power capacity at this time is maintained unchanged at 10 kW.

In the second pattern 520, the total power capacity is increased when the electric vehicle is discharged. For example, at the first time interval, the electric vehicle is discharged (a long bar portion 521). For example, the discharged power is 5 kW. At this time, the total power capacity is correspondingly increased by 5 kW (a long bar portion 523). The modified total power capacity is shown as the plot 522.

Figure 6:
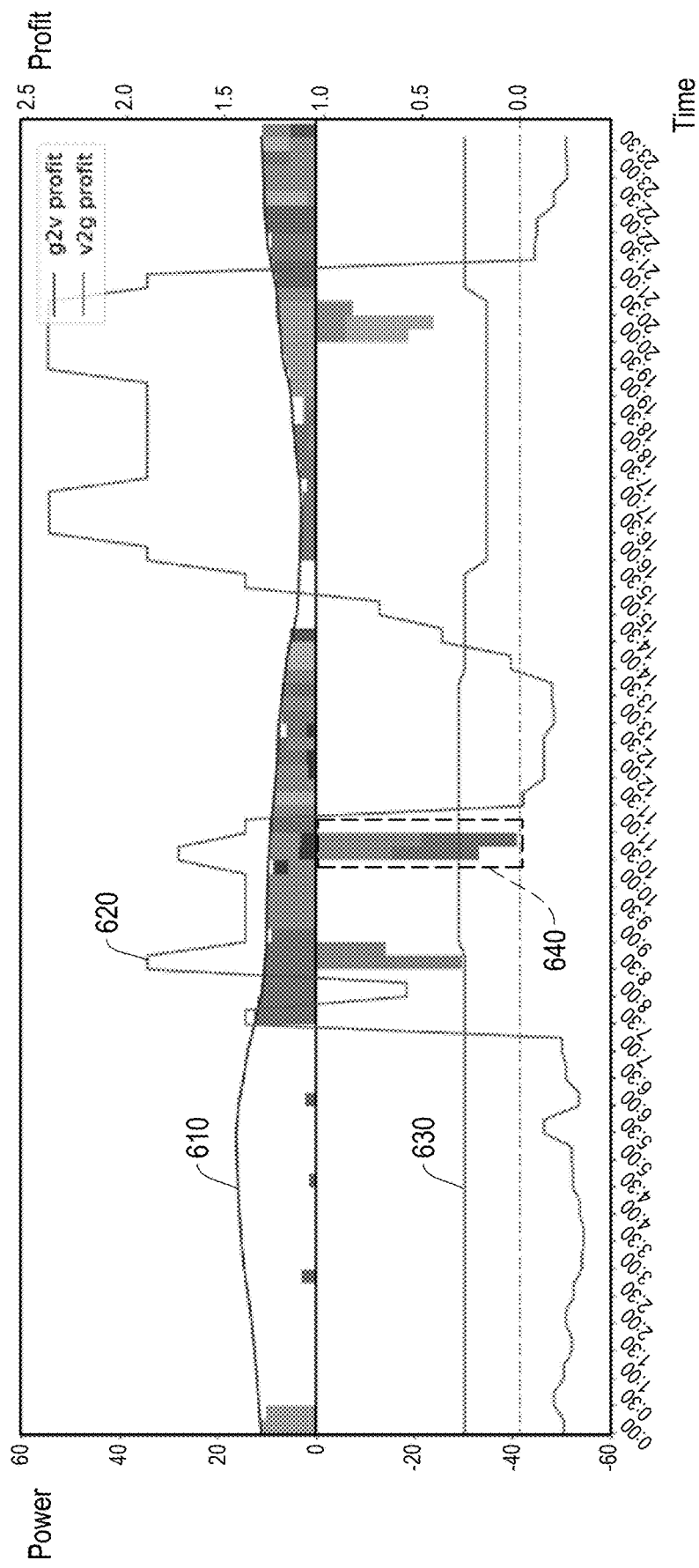
FIG. 6 is a plot diagram of charge-discharge operation in each period under the first pattern according to an embodiment of the disclosure.

The first pattern 510 has a better chance of selling the electric power released by the electric vehicle to the grid 130, which may maximize the profit. In comparison, the second pattern 520 may allow other electric vehicles to have more charging resources and maximize the user satisfaction. FIG. 6 is a plot diagram of charge-discharge operation in each period under the first pattern according to an embodiment of the disclosure. Referring to FIG. 6, a horizontal axis is time, a left vertical axis is power, and a right vertical axis is profit. A plot 610 represents the total power capacity, a plot 620 represents the profit per unit of electric power under the V2G transmission pattern, and a plot 630 represents the profit per unit of electric power under the G2V transmission pattern. Please pay attention to a long bar portion 640. At this time, the electric vehicles are discharged, but the plot 610, which represents the total power capacity, has not changed. In the meantime, the surplus of electric power is sold to the grid, and since the profit of selling electricity to the grid is higher (the plot 620 is higher), more profits by selling electricity are obtained.

Figure 7:
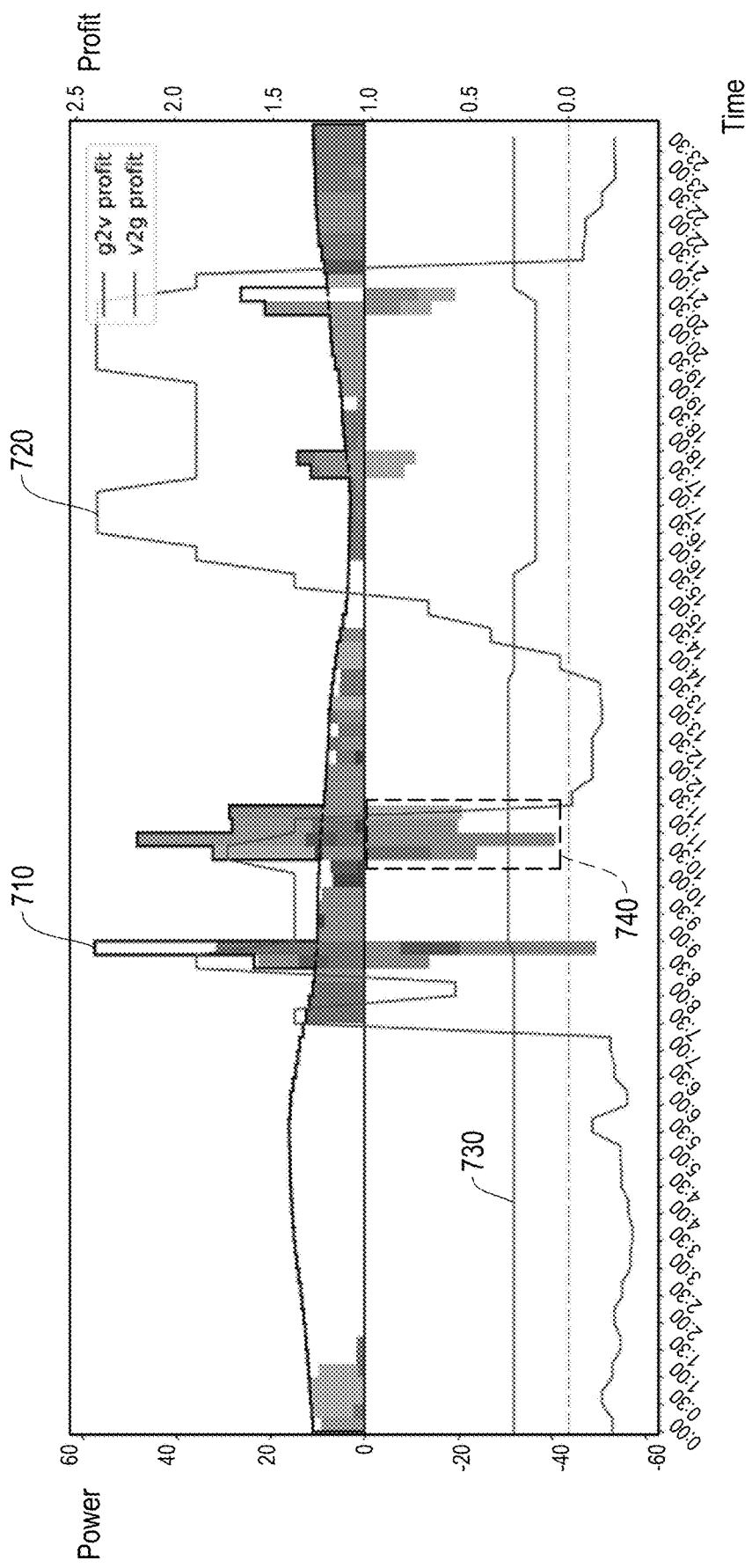
FIG. 7 is a plot diagram of charge-discharge operation in each period under the second pattern according to an embodiment of the disclosure.

FIG. 7 is a plot diagram of charge-discharge operation in each period under the second pattern according to an embodiment of the disclosure. Referring to FIG. 7, the same horizontal axis is time, the left vertical axis is power, and the right vertical axis is the profit. A plot 710 represents the total power capacity, a plot 720 represents the profit per unit of electric power under the V2G transmission pattern, and a plot 730 represents the profit per unit of electric power under the G2V transmission pattern. Please pay attention to a long bar portion 740. At this time, the electric vehicles are discharged, and the plot 710, which represents the total power capacity, rises up. At this time, more electric vehicles may be charged, which can improve the user satisfaction, but no surplus of electric power may be sold to the grid.

In some experiments, please refer to Table 1 below for the satisfaction and the profit in FIG. 6 and FIG. 7.

TABLE 1

|  | Satisfaction (%) | Profit | | | |
|---|---|---|---|---|---|
|  |  | G2V | V2G | V2V | Total profit |
| First pattern | 79.55 | 29.3 | 49.02 | −0.84 | 77.48 |
| Second pattern | 90.18 | 33.5 | 18.5 | −2.44 | 49.55 |

As shown in Table 1, in the first pattern, because more power may be sold to the grid, the V2G profit is increased, but the satisfaction is low. On the contrary, in the second pattern, the satisfaction is high, but the V2G profit is low.

Figure 8:
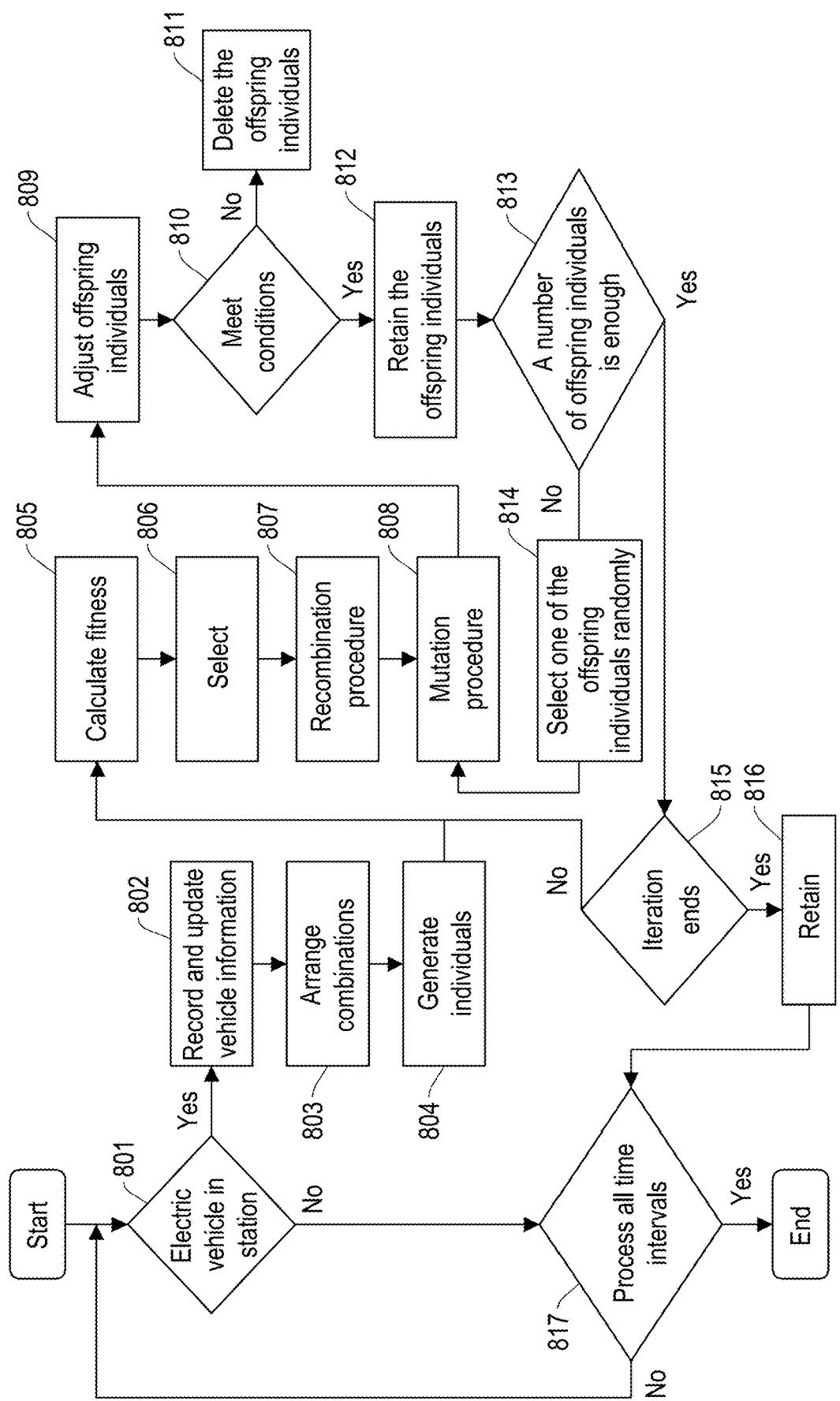
FIG. 8 is a flowchart of a bio-inspired algorithm according to an embodiment of the disclosure.

FIG. 8 is a flowchart of a bio-inspired algorithm according to an embodiment of the disclosure. Referring to FIG. 8, in step 801, for time t, a determination whether there is an electric vehicle in the charge-discharge system currently is made, and if so, a step 802 is executed. In step 802, the vehicle information is recorded and updated, including recording the state of charging of each electric vehicle, etc.

Figure 9:
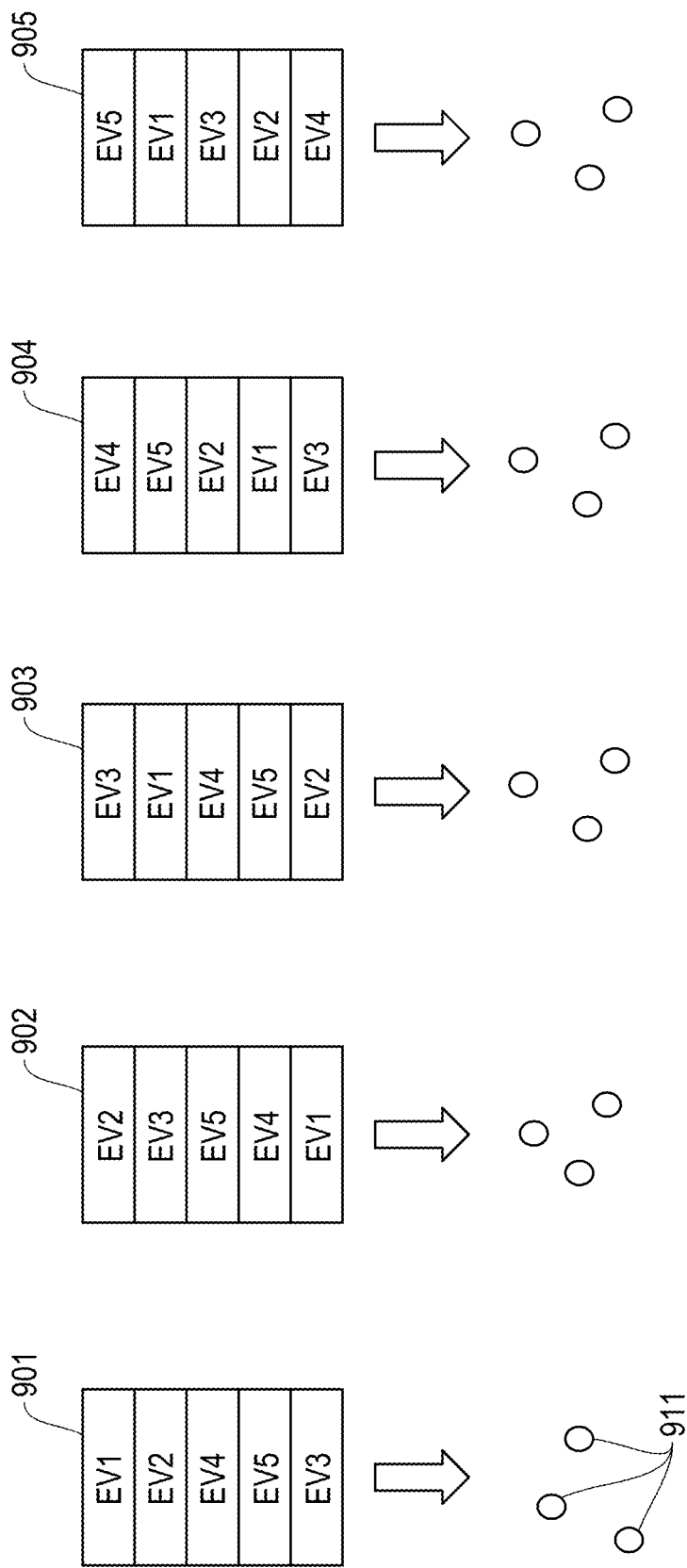
FIG. 9 is a schematic diagram of a combination according to an embodiment of the disclosure.

Next, initialization is performed to generate multiple individuals. Each individual includes the charge-discharge operation of all electric vehicles on the corresponding charge-discharge devices at all time intervals. That is, each individual represents a candidate solution. In this embodiment, the initialization includes steps 803 and 804. In step 803, multiple combinations are generated for the electric vehicles. FIG. 9 is a schematic diagram of a combination according to an embodiment of the disclosure. Referring to FIG. 8 and FIG. 9, it is assumed here that there are a total of five electric vehicles EV1 to EV5. FIG. 9 shows five combinations 901 to 905. Each combination has its own vehicle order. For example, the vehicle order in the combination 901 is the electric vehicles EV1, EV2, EV4, EV5, and EV3, the vehicle order in the combination 902 is the electric vehicles EV2, EV3, EV5, EV4, and EV1, and so on.

In step 804, for each combination, the charge-discharge operation of each electric vehicle on the corresponding charge-discharge devices at all time intervals are determined according to a corresponding vehicle order to generate the individuals. Taking the combination 901 as an example, the charge-discharge operation of the electric vehicle EV1 at all time intervals are determined first, and then the charge-discharge operation of the electric vehicle EV2 at all time intervals are determined. Here, any probability distribution may be used to determine the charge-discharge operation. After the charge-discharge operation of the electric vehicles EV1 to EV5 are determined according to the vehicle order, an individual is formed. This step is repeated, and sampling is done again to generate multiple individuals 911 according to the probability distribution.

It is determined that the charge-discharge operation of the electric vehicle in the first order may affect the charge-discharge operation of the electric vehicle in the later order. For example, after the electric vehicle EV1 is charged first, the total power capacity is reached, so that the electric vehicle EV2 may not be charged. In order to find the optimal solution, various possibilities should be tried in the initialization stage. Therefore, the condition may be set out that each electric vehicle EV1 to EV5 is ranked first in a certain combination. For example, the electric vehicle EV1 is located in the first ranking in the combination 901, the electric vehicle EV2 is located in the first ranking in the combination 902, and so on. In an embodiment, after the first ranking is determined, subsequent rankings may be randomly generated.

In some embodiments, the probability distribution used in step 804 may also be adjusted according to the system information. When the charging profit is higher, the probability of charging is increased, and when the discharging profit is higher, the probability of discharging is increased. For example, at a certain point in time, if the profit per unit of electric power under the G2V transmission pattern is higher, or the total power capacity is higher, both situations may increase the probability of setting the charge-discharge operation to charging. In another aspect, at a certain point in time, if the profit per unit of electric power under the V2G transmission pattern is higher, the probability of setting the charge-discharge operation to discharging may be increased. Alternatively, during the stay time of an electric vehicle, there is a higher probability of discharging at an earlier time point and a lower probability of discharging at a later time point.

Figure 10:
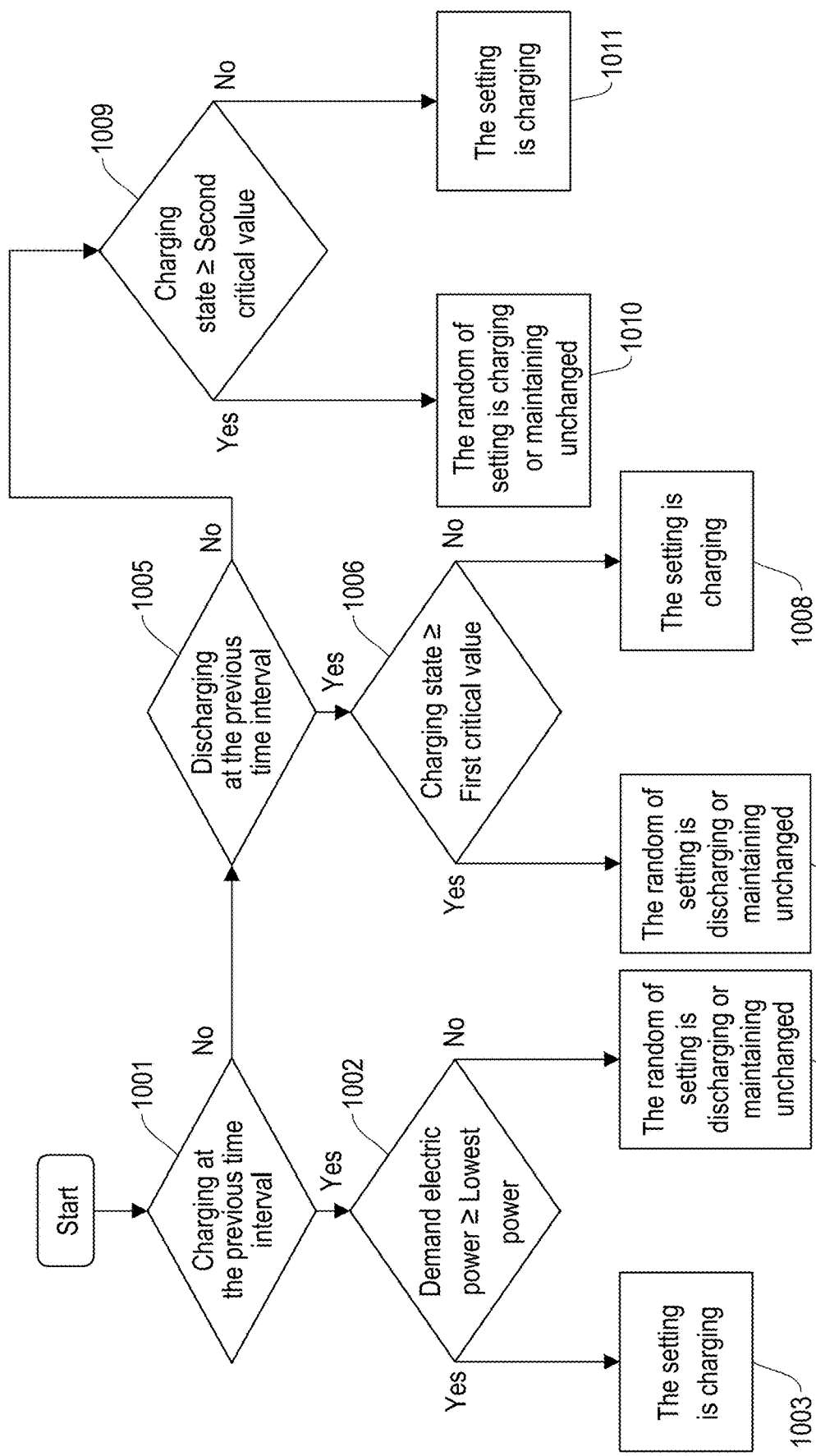
FIG. 10 is a flowchart of a determination of charge-discharge operation in step 804 according to an embodiment of the disclosure.

FIG. 10 is a flowchart of a determination of charge-discharge operation in step 804 according to an embodiment of the disclosure. The process of FIG. 10 is used to determine whether the charge-discharge operation of an electric vehicle are charging, discharging, or maintaining unchanged during the initialization. In step 1001, for an electric vehicle, a determination whether the charge-discharge operation of the electric vehicle in the previous time interval is charging is made. If the determination result of the step 1001 is yes, in step 1002, a determination whether the demand electric power of this electric vehicle is greater than or equal to the minimum power of the corresponding charging device is made. If the determination result of the step 1002 is yes, the corresponding charge-discharge operation is set to charging in step 1003. If the determination result of the step 1003 is no, the state of charging of the electric vehicle is already very high, and the demand electric power may exceed due to further charging. Therefore, in step 1004, the corresponding charge-discharge operation is randomly set to discharging or maintaining unchanged.

If the determination result of the step 1001 is no, in step 1005, a determination whether the charge-discharge operation of the electric vehicle at the previous time interval is discharging is made. If so, the step 1006 is proceeded. In step 1006, a determination whether the current state of charging of the electric vehicle is greater than or equal to a first critical value is made. The first critical value is, for example, greater than or equal to 50% and less than or equal to 70%. In an embodiment, a value may be randomly selected in the range of 50% to 70% as the first critical value. If the determination result of step 1006 is yes, in step 1007, the charge-discharge operation is randomly set to discharging or maintaining unchanged. If the determination result of step 1006 is no, the charge-discharge operation is set to charging in step 1008.

If the determination result of step 1005 is no, in step 1009, a determination whether the current state of charging of the electric vehicle is greater than or equal to a second critical value is made. The second critical value is less than or equal to the aforementioned first critical value. For example, the second critical value is 50%. If the determination result of the step 1009 is yes, the charge-discharge operation is randomly set to charging or discharging in step 1010. If the determination result of the step 1009 is no, the charge-discharge operation is set to charging in step 1011. After the determination whether the charge-discharge operation is charging, discharging, or maintaining unchanged is made, the power may be determined according to the probability distribution.

Each of the aforementioned combinations 901 to 905 generates the individuals (for example, a number of five hundred). Afterwards, these individuals are collected for the next step. In step 805, the fitness of each individual is calculated according to the fitness function. The specific formula of this fitness function is described in the following paragraphs.

In step 806, multiple first individuals are selected from all individuals according to the fitness. In this embodiment, it is preferred to have the greater fitness. Therefore, the first individuals with the greatest fitness may be selected. The number of first individuals is not limited thereto.

In step 807, a recombination procedure is executed. Taking the ES as an example, each individual may represent as a vector, and each element on the vector may be regarded as a gene. This gene corresponds to a corresponding time interval and the corresponding charge-discharge operation of the electric vehicle. From the first individual, any two individuals may be selected as the father individual and the mother individual respectively, and then an intermediate recombination or a discrete recombination may be adopted, which is not limited by the disclosure. If the GA is adopted, some elements may be selected from the mother individual, and the remaining elements may be selected from the father individual for mating, which is not limited by the disclosure. After the recombination procedure, multiple offspring individuals are generated.

In step 808, the mutation procedure is performed. Taking the ES as an example, the probability distribution (such as Gaussian distribution) may be selected first, and then a noise is added to each gene of each offspring individual according to this probability distribution. This noise may be a positive number or a negative number.

In step 809, the offspring individuals are adjusted. Here, the gene in the offspring individuals may be adjusted according to the system information and vehicle information. For example, at a time interval, when a sum of the charge amount of all electric vehicles is greater than the total power capacity, the sum of the charge amount may be subtracted from the total power capacity to obtain a difference value. Next, for each electric vehicle, this difference value is subtracted from a corresponding charge amount to determine whether the charge amount is less than the minimum power of the specification limit. If the charge amount of the electric vehicles is not less than the minimum value of the specification limit after adjustment, one of the electric vehicles is selected to reduce its charge amount.

In step 810, a determination whether the offspring individuals meet the conditions is made. As mentioned above, these conditions must comply with the specifications of the electric vehicles and the charge-discharge devices. If a determination that the offspring individuals do not meet the conditions is still made in step 810 after the adjustment in step 809, these adjusted offspring individuals are deleted in step 811. The offspring individuals meeting the conditions are retained in step 812. Next, in step 813, a determination whether the number of retained offspring individuals is greater than or equal to a preset number is made. If not, one or the offspring individuals are randomly selected in step 814 to continue the mutation procedure of the step 808, so as to ensure that there are enough offspring individuals to proceed to the next iteration.

If the determination result of the step 813 is yes, in step 815, a determination whether the current time of iterations has reached the upper limit is made. If not, returning to the step 805, the offspring individuals are treated as individuals of the new generation to continue with subsequent steps. If the current time of iterations has reached the upper limit, in step 816, a certain number of individuals are retained for the next time interval. For example, fifty individuals with the greatest fitness are selected. Although only one individual with the greatest fitness is needed, forty nine additional individuals may be used for the next time interval. These individuals may be added to the initialized individuals when the bio-inspired algorithm is executed in the next time interval, which helps to quickly find the optimal solution. In step 817, a determination whether all time intervals have been processed is made, and if so, the process ends. If the determination result of the step 817 is no, returning to the step 801, the next time interval is processed.

Figure 11:
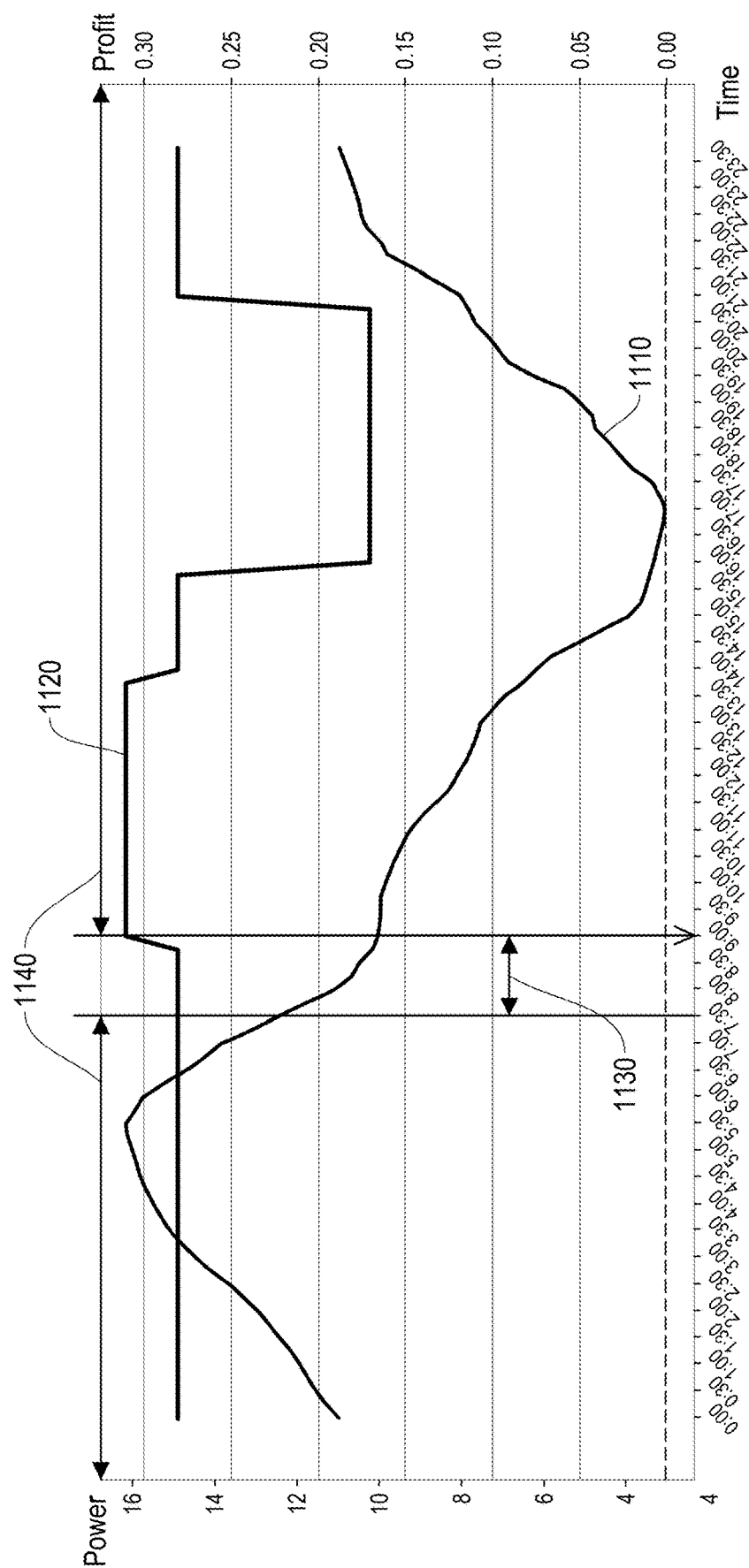
FIG. 11 is a schematic diagram of the use of different fitness functions in different time periods according to an embodiment of the disclosure.

Next, the fitness function is described. In this embodiment, there are two fitness functions, namely the first fitness function and the second fitness function. FIG. 11 is a schematic diagram of the use of different fitness functions in different time periods according to an embodiment of the disclosure. Referring to FIG. 11, the horizontal axis is time, the left vertical axis is power, and the right vertical axis is profit. A plot 1110 represents the total power capacity, and a plot 1120 represents the profit per unit of electric power under the G2V transmission pattern. As can be seen from FIG. 11, a plot 1120 starts to rise after 9:00 am, which makes the bio-inspired algorithm tend to set the charge-discharge operation to charging after 9:00 am in order to obtain higher profits. However, the total power capacity gradually decreases after 9:00 in the morning. If more charging is scheduled at this time, a charging bottleneck may be caused, so charging may be encouraged in the period before 9:00 in the morning. In an embodiment, a determination whether the profit per unit of electric power corresponding to the grid-to-vehicle profit increases over time and the total power capacity decreases over time is made. For example, a determination whether the slope of the plot 1120 is greater than 0 and whether the slope of the plot 1110 is less than 0 is made. In FIG. 11, a time interval meeting this determination is 9:00 in the morning. Based on this time interval, the time intervals (for example, a number of six) are taken as the previous time interval 1130. In this example, the previous time interval is within a time range of 7:30 to 9:00 in the morning. In the previous time interval, the fitness function may be set to the first fitness function, while in the rest time intervals 1140 the fitness function may be set to the second fitness function. The first fitness function is expressed as the following Mathematical Formula 5, and the second fitness function is expressed as the following Mathematical Formula 6.

$$O_1 = \max[T \cdot Q \cdot Q \cdot R \cdot P_1 \cdot P_2] \qquad \text{[Mathematical Formula 5]}$$

$$O_2 = \max[T \cdot Q \cdot Q \cdot P_1 \cdot P_2] \qquad \text{[Mathematical Formula 6]}$$

In the aforementioned formulas, T represents the total profit, Q represents the user satisfaction, R is the motivation factor, $P_1$ is the first penalty factor, and $P_2$ is the second penalty factor. In other words, the first fitness function $O_1$ includes the motivation factor R more than the second fitness function $O_2$. This motivation factor R is greater than 1, so the greatest fitness may be calculated according to the first fitness function, which may encourage charging within the time range of 7:30 to 9:00.

The total profit T in Mathematical Formulas 5 and 6 is a sum of the aforementioned Mathematical Formulas 1 to 3. In an embodiment, the user satisfaction Q corresponding to an electric vehicle may be calculated once when the electric vehicle leaves the station, or may be calculated once in each time interval. The user satisfaction Q may be obtained by adding up (or averaging) the user satisfaction of all electric vehicles. For example, the user satisfaction Q may be calculated by using the following Mathematical Formula 7.

$$Q = \sum_{ev=1}^{m} \left( \frac{\sum_{t=1}^{n} r_{t,ev}}{D_{ev}} \right) \qquad \text{[Mathematical Formula 7]}$$

In Mathematical Formula 7, $r_{t,\,ev}$ represents the power amount received by the electric vehicle ev during the time interval t, and $D_{ev}$ represents the demand electric power of the electric vehicle ev.

The first penalty factor is configured to prevent the charge-discharge operation of the electric vehicle from being discharged at the last few time intervals before the electric vehicle leaves the station. Therefore, if there is an electric vehicle whose charge-discharge operation is discharging at least one of the last time intervals, the first penalty factor is set to reduce the calculated fitness according to the fitness function. For example, the first penalty factor may be set to be less than 1, and in some embodiments, the first penalty factor may also be set to be less than 0.

Figure 12:
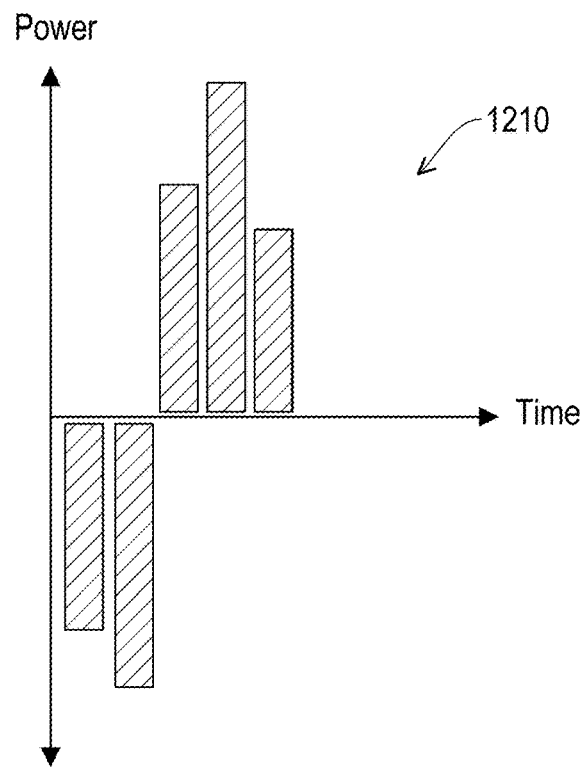
FIG. 12 is a schematic diagram of a scenario of setting the first penalty factor according to an embodiment of the disclosure.
Figure 12:
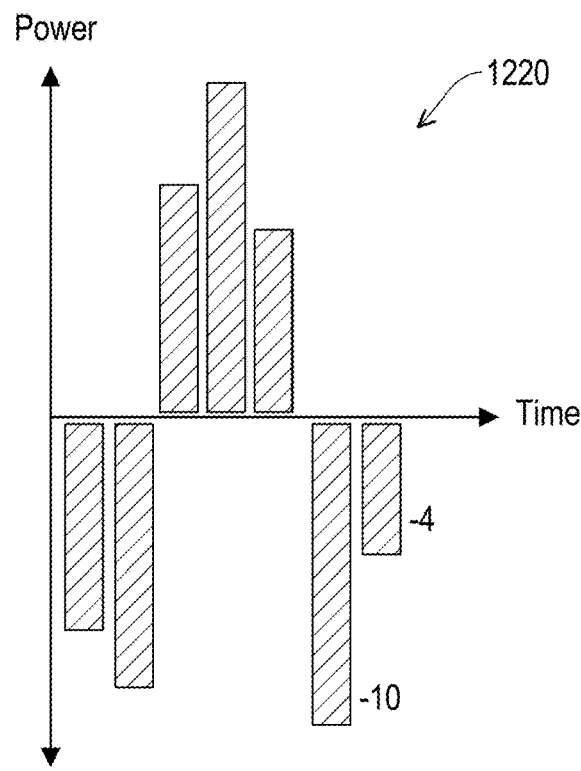

FIG. 12 is a schematic diagram of a scenario of setting the first penalty factor according to an embodiment of the disclosure. Referring to FIG. 12, a determination whether the last two time intervals are discharged is made. In scenario 1210, the electric vehicle is charged at the last two time intervals, so a penalty term $P_{ev}^{\,i}=0$ is set. In another aspect, in scenario 1220, the electric vehicle is discharged in the last two time intervals, so the power discharged at these two time intervals may be added up as a penalty term $P_{ev}^{\,i}$. Specifically, the penalty term $P_{ev}^{\,i}$ is calculated as shown in the following Mathematical Formula 8.

$$p_{ev}^{i} = r_{p}^{f} \times (-1) \qquad \text{[Mathematical Formula 8]}$$

In Mathematical Formula 8, $r_p^{\,f}$ represents the discharged power at the last two time intervals. Since this power is less than 0, this power must be multiplied by −1. In the example of FIG. 12, the specific calculations are $r_p^{\,f}=(-10)+(-4)=-14$ and $p_{ev}^{\,i}=(-14)\times(-1)=14$. According to the setting, the penalty term $p_{ev}^{\,i}$ may only be 0 or greater than 1. Next, according to the following Mathematical Formula 9, the first penalty term $P_1$ may be calculated according to the penalty term $p_{ev}^{\,i}$. When the first penalty term $P_1$ is equal to 1, there is no penalty. When the first penalty term $P_1$ is greater than 1 (the value is N>0), there is a penalty.

$$P_1 = \left( \sum_{ev=1}^{m} p_{ev}^{i} \right) + 1 \qquad \text{[Mathematical Formula 9]}$$

In another aspect, the second penalty factor avoids the state of charging of the electric vehicle at the departure time being lower than the state of charging of the electric vehicle at the departure time. Therefore, when the state of charging of the electric vehicle at the departure time is lower than the state of charging of the electric vehicle at the departure time, the second penalty factor may be set to reduce the calculated fitness according to the fitness function. For example, the second penalty factor may be set to be less than 1, in some embodiments, the second penalty factor may also be set to be less than 0.

In an embodiment, the state of charging of the electric vehicle at the departure time minus the state of charging of the electric vehicle at the departure time may be calculated as the penalty term, expressed as $SOC_{final} - SOC_{start} = P_{ev}^{\,ii}$. For example, if $SOC_{start}=70\%$, $SOC_{final}=68\%$, then $p_{ev}^{\,ii}=0.68-0.7=-0.02$. If the state of charging of the electric vehicle at the departure time is greater than the state of charging of the electric vehicle at the arrival time, then there is a penalty term $p_{ev}^{\,ii}=0$. Under the setting, the penalty term $P_{ev}^{\,ii}$ is only equal to 0 or less than 0. Next, the following Mathematical Formulas 10 and 11 are performed in sequence to calculate the second penalty factor $P_2$. When the second penalty factor $P_2$ is equal to 1, there is no penalty. When the second penalty factor $P_2$ is less than 0, there is a penalty (the absolute value of the second penalty factor $P_2$ is M, where M>0).

$$P_2 = \sum_{ev=1}^{m} p_{ev}^{ii} \qquad \text{[Mathematical Formula 10]}$$

-continued $$P_2 = \begin{cases} 1 & \text{if } P_2 = 0 \\ P_2 & \text{otherwise} \end{cases} \qquad \text{[Mathematical Formula 11]}$$

Next, adjustments are made according to the positive and negative signs of the first penalty term P1 and the second penalty term P2. For specific adjustments, please refer to Table 1300 in FIG. 13. In the first scenario, the first penalty term P1 and the second penalty term P2 both indicate that there is no penalty, and their values are both 1, so the result of multiplication is also 1.

In the second scenario, the first penalty term P1 indicates that there is no penalty, and the second penalty term P2 indicates that there is a penalty. Therefore, the value of the first penalty term P1 is 1, and the value of the second penalty term P2 is –M, where M>0. The result of multiplying the first penalty term P1 and the second penalty term P2 is –M.

In the third scenario, the first penalty term P1 indicates that there is a penalty, and the second penalty term P2 indicates that there is no penalty. In such a scenario, additional calculations must be done, the second penalty P2 is set as –1. The value of the first penalty term P1 is N, where N>0. The result of multiplying the first penalty term P1 and the second penalty term P2 is –N.

In the fourth scenario, the first penalty item P1 indicates that there is a penalty, and the second penalty item P2 indicates that there is a penalty. The value of the first penalty term P1 is N, and the value of the second penalty term P2 is –M. The result of multiplying the first penalty term P1 and the second penalty term P2 is –N×M.

In the second to fourth scenarios of the Table 1300, the results of multiplying the first penalty term P1 and the second penalty term P2 are both less than 0, which makes the calculated fitness less than 0 according to the fitness function. It is not easy to select the individual with the fitness less than 0 in the bio-inspired algorithm.

In some embodiments, importance and weight may also be added when the total profit is calculated. Since the importance is related to time, the G2V profit, the V2G profit, and the V2V profit must be calculated at each time interval. The aforementioned Mathematical Formulas 1 to 3 may be rewritten as the following Mathematical Formulas 12 to 14 respectively.

$$g2v\,\rho_t = \max\left[\sum_{ev=1}^{m}\max(\mathbb{P}_{t,ev},0) + \left(\sum_{ev=1}^{m}\min(\mathbb{P}_{t,ev},0)\times E\right),0\right]\times \Delta t \times \widehat{\rho_t^{g2v}} \qquad \text{[Mathematical Formula 12]}$$

$$v2g\,\rho_t = \max\left[\left(\sum_{ev=1}^{m}\min(\mathbb{P}_{t,ev},0)\times E\times(-1)\right) - \sum_{ev=1}^{m}\max(\mathbb{P}_{t,ev},0),0\right]\times \Delta t \times \widehat{\rho_t^{v2g}} \qquad \text{[Mathematical Formula 13]}$$

$$v2v\,\rho_t = \left[\sum_{ev=1}^{m}\max(\mathbb{P}_{t,ev},0)\right] - g2v\_power \times \Delta t \times \widehat{\rho_t^{v2v}} \qquad \text{[Mathematical Formula 14]}$$

At a certain time interval t, the profit adjusted by the importance and the weight is expressed as the following Mathematical Formula 15.

$$\hat{\rho_t} = \delta \times [(\rho_t \times W \times 10000) + I_t \times 10]^2 \qquad \text{[Mathematical Formula 15]}$$

In Mathematical Formula 15, $\rho_t$ is the profit per unit of electric power under different transmission patterns, and $\hat{\rho_t}$ is the profit after weight and importance adjustment and may be substituted into $\widehat{\rho_t^{g2v}}$, $\widehat{\rho_t^{v2g}}$, and $\widehat{\rho_t^{v2v}}$ in Mathematical Formulas 12 to 14. For the settings of variable δ, weight W, and importance $I_t$, please refer to Table 1400 in FIG. 14.

When the grid-to-vehicle profit g2v $\rho_t$ is calculated, the variable δ is 1, the weight W is a constant (for example, 1), and the importance $I_t$ is a function I_g2v. This function changes as the stay time of the vehicle decreases monotonically in the charge-discharge system. For example, if the stay time of the vehicle in the charge-discharge system includes three time intervals, then the importance of the first time interval may be set as 3, the importance of the second time interval may be set as 2, and the importance of the third time interval may be set as 1. In other embodiments, the importance of the three time intervals may also be set as 3, 3, and 2 respectively, which is not limited by the disclosure. The importance is to charge the vehicle as early as possible with the same profit.

When the vehicle-to-grid profit v2g $\rho_t$ is calculated, the variable δ is 1. The weight W is positively related to the difference value between the profit $\rho_t^{v2g}$ per unit of electric power under the V2G transmission pattern and the profit $\rho_t^{g2v}$ per unit of electric power under the G2V transmission pattern. The reason is that the larger difference value is more suitable for the V2G transmission pattern. In another aspect, the importance $I_t$ is a function I_v2g, which also decreases monotonically with the stay time of the vehicle in the charge-discharge system. In some embodiments, the function I_v2g is different from a function I_g2v.

When the vehicle-to-vehicle profit v2v $\rho_t$ is calculated, the variable δ is –1. The weight W is positively related to the profit $\rho_t^{v2g}$ per unit of electric power under the V2G transmission pattern. This reason is that the higher vehicle-to-grid profit does not incline to perform the V2V transmission pattern (the variable δ is –1, making the relationship between the two negative). Additionally, the importance $I_t$ is the function I_v2g.

After the Mathematical Formulas 12 to 14 for various profits are calculated, the time t may be added up to calculate the total profit.

Figure 15:
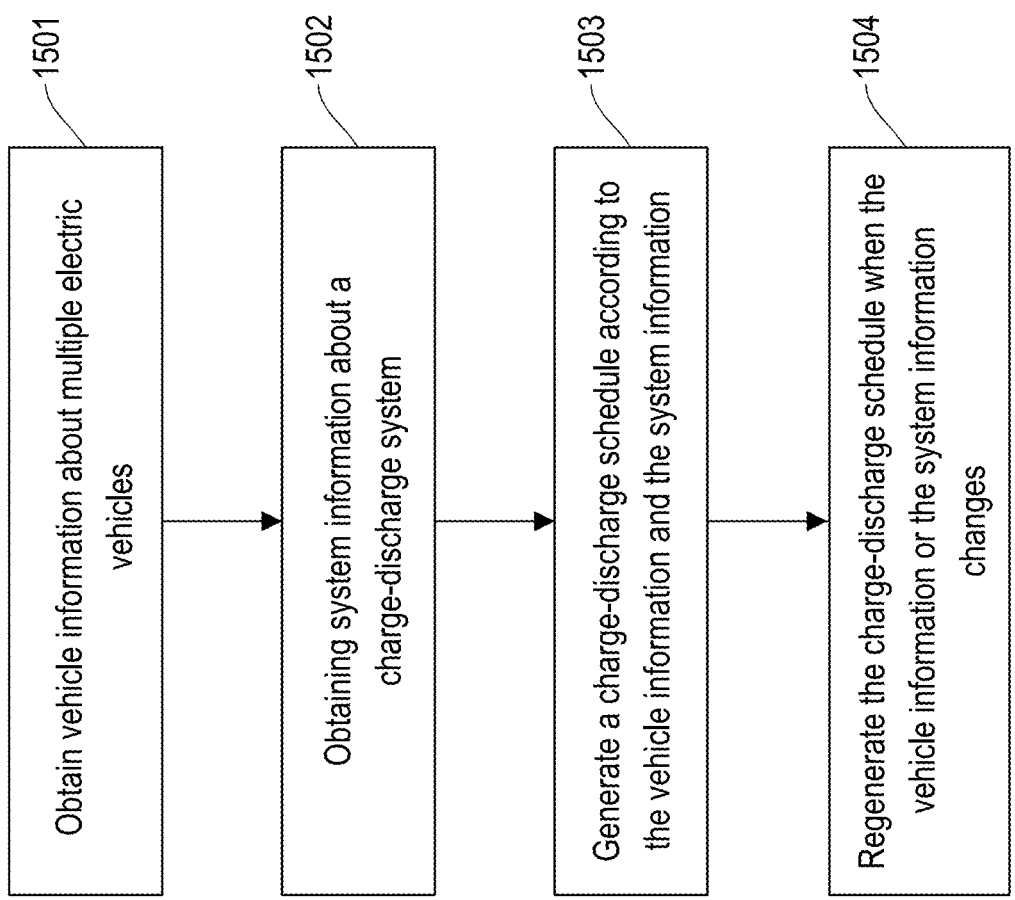
FIG. 15 is a flowchart of a method for scheduling charging and discharging according to an embodiment.

FIG. 15 is a flowchart of a method for scheduling charging and discharging according to an embodiment. Referring to FIG. 15, in step 1501, multiple vehicle information of the electric vehicles are obtained. In step 1502, the system information of the charge-discharge system is obtained. The vehicle information and the system information have been described in detail above and are not be repeated herein.

In step 1503, a charging and discharging scheduling is generated according to the vehicle information and the system information. This charge-discharge schedule may be achieved by using the aforementioned bio-inspired algorithm or other algorithms. For example, in some embodiments, a greedy algorithm may be adopted to give priority to charge the electric vehicle with the lowest state of charging, and then other electric vehicles are scheduled according to the state of charging.

In step 1504, when the vehicle information or the system information are changed, the charging and discharging scheduling is regenerated. For example, the charging scheduling may be regenerated when the electric vehicle enters or leaves the station. Alternatively, the charge schedule may be regenerated when the total power capacity is changed, or when any profit per unit of electric power is changed.

According to the aforementioned system and the aforementioned method, the profit and the satisfaction may be balanced, and the suitable charge-discharge operation may be found. In addition, due to the weight, the importance, the penalty items, early start of charging, and other designs, the profit or the satisfaction can be improved.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A method for scheduling charging and discharging for a charge-discharge system, wherein the charge-discharge system is electrically connected to a grid, the charge-discharge system comprises a plurality of charge-discharge devices, and the method for scheduling charging and discharging comprises:
    obtaining a plurality of vehicle information about a plurality of electric vehicles, wherein the plurality of vehicle information comprises a departure time and a state of charging, and each of the plurality of electric vehicles corresponds to one of the plurality of charge-discharge devices;
    obtaining a plurality of system information about the charge-discharge system, wherein the system information comprises a plurality of profits, and the plurality of profits comprise a grid-to-vehicle profit, a vehicle-to-grid profit, and a vehicle-to-vehicle profit;
    establishing a fitness function according to the plurality of vehicle information and the plurality of system information;
    executing a bio-inspired algorithm to determine a charge-discharge operation for each of the plurality of electric vehicles on a corresponding charge-discharge device at each of a plurality of time intervals according to the fitness function; and
    applying a corresponding charge-discharge operation to a corresponding electric vehicle by the plurality of charge-discharge devices.

2. The method for scheduling charging and discharging according to claim 1, wherein the plurality of system information further comprises a total power capacity, and the method for scheduling charging and discharging further comprises:
    maintaining the total power capacity unchanged in a first pattern when one of the plurality of electric vehicles is discharged; and
    increasing the total power capacity in a second pattern when one of the plurality of electric vehicles is discharged.

3. The method for scheduling charging and discharging according to claim 1, wherein the step of executing the bio-inspired algorithm according to the fitness function comprises:
    performing an initialization to generate a plurality of individuals, wherein each of the plurality of individuals comprises a plurality of charge-discharge operations of the plurality of electric vehicles on the corresponding charge-discharge devices at the plurality of time intervals;
    calculating a fitness of each of the plurality of individuals according to the fitness function;
    selecting a plurality of first individuals from the plurality of individuals according to the fitness;
    performing a recombination procedure and a mutation procedure on the plurality of first individuals to generate a plurality of offspring individuals; and
    adjusting the plurality of offspring individuals according to the plurality of system information and the plurality of vehicle information, and deleting at least one of the adjusted offspring individuals to proceed a next iteration according to a plurality of conditions.

4. The method for scheduling charging and discharging according to claim 3, wherein the step of performing the initialization to generate the plurality of individuals comprises:
    generating a plurality of combinations for the plurality of electric vehicles; and
    determining the plurality of charge-discharge operations of the plurality of electric vehicles on the corresponding charge-discharge devices at the plurality of time intervals according to a corresponding vehicle order, for each of the plurality of combinations, wherein each of the plurality of electric vehicles is in first order in one of the plurality of combinations.

5. The method for scheduling charging and discharging according to claim 1, wherein the plurality of vehicle information further comprises an arrival time, and the step of establishing the fitness function according to the plurality of vehicle information and the plurality of system information comprises:
    calculating a charge amount according to the state of charging of the plurality of electric vehicles at a corresponding arrival time and the state of charging of the plurality of charge-discharge operations at the plurality of time intervals;
    calculating a demand electric power according to the state of charging, an expected departure power, and a battery capacity of the plurality of electric vehicles at the corresponding arrival time;
    calculating a satisfaction according to the charge amount and the demand electric power;
    adding up the plurality of profits at the plurality of time intervals to obtain a total profit; and
    establishing the fitness function according to the satisfaction and the total profit.

6. The method for scheduling charging and discharging according to claim 5, wherein the step of establishing the fitness function according to the plurality of vehicle information and the plurality of system information further comprises:
    setting the fitness function to a first fitness function at least one of previous time intervals of the plurality of time intervals if a profit per unit of electric power under a grid-to-vehicle transmission pattern increases over time and the total power capacity decreases over time, and setting the fitness function to a second fitness function at rest time intervals of the plurality of time intervals, wherein the first fitness function comprises a motivation factor more than the second fitness function.

7. The method for scheduling charging and discharging according to claim 5, wherein the fitness function comprises a first penalty factor, and the method for scheduling charging and discharging further comprises:
    setting the first penalty factor to reduce the calculated fitness according to the fitness function if the charge-discharge operation of one of the plurality of electric vehicles at least one of last time intervals of the plurality of time intervals is discharging.

8. The method for scheduling charging and discharging according to claim 7, wherein the fitness function comprises a second penalty factor, and the method for scheduling charging and discharging further comprises:

setting the second penalty factor to reduce the calculated fitness according to the fitness function if the state of charging of one of the plurality of electric vehicles at the departure time is lower than the state of charging at the arrival time.

9. The method for scheduling charging and discharging according to claim 5, wherein the total profit further comprises an importance, and the method for scheduling charging and discharging further comprises:

setting the importance to decrease monotonically with a stay time of the plurality of electric vehicles in the charge-discharge system.

10. The method for scheduling charging and discharging according to claim 5, wherein the total profit further comprises a weight, and the method for scheduling charging and discharging further comprises:

setting the weight to a constant when the grid-to-vehicle profit is calculated;

setting the weight to be positively related to a difference value between a profit per unit of electric power under a vehicle-to-grid transmission pattern and a profit per unit of electric power under a grid-to-vehicle transmission pattern when the vehicle-to-grid profit is calculated; and setting the weight to be positively related to the profit per unit of electric power under the vehicle-to-grid transmission pattern when the vehicle-to-vehicle profit is calculated.

11. A charge-discharge system, electrically connected to a grid, the charge-discharge system comprising:

a plurality of charge-discharge devices; and a charge-discharge controller, electrically connected to the plurality of charge-discharge devices and configured to execute a plurality of steps:

obtaining a plurality of vehicle information about a plurality of electric vehicles, wherein the plurality of vehicle information comprises a departure time and a state of charging, and each of the plurality of electric vehicles corresponds to one of the plurality of charge-discharge devices;

obtaining a plurality of system information about the charge-discharge system, wherein the plurality of system information comprises a plurality of profits, and the plurality of profits comprise a grid-to-vehicle profit, a vehicle-to-grid profit, and a vehicle-to-vehicle profit;

establishing a fitness function according to the plurality of vehicle information and the plurality of system information;

executing a bio-inspired algorithm to determine a charge-discharge operation for each of the plurality of electric vehicles on a corresponding charge-discharge device at each of a plurality of time intervals according to the fitness function; and applying a corresponding charge-discharge operation to a corresponding electric vehicle by the plurality of charge-discharge devices.

12. The charge-discharge system according to claim 11, wherein the plurality of system information further comprises a total power capacity, and the plurality of steps further comprise:

maintaining the total power capacity unchanged in a first pattern when one of the plurality of electric vehicles is discharged; and increasing the total power capacity in a second pattern when one of the plurality of electric vehicles is discharged.

13. The charge-discharge system according to claim 11, wherein the step of executing the bio-inspired algorithm according to the fitness function comprises:

performing an initialization to generate a plurality of individuals, wherein each of the plurality of individuals comprises the plurality of charge-discharge operations of the plurality of electric vehicles on the corresponding charge-discharge devices at the plurality of time intervals;

calculating a fitness of each of the plurality of individuals according to the fitness function;

selecting a plurality of first individuals from the plurality of individuals according to the fitness;

performing a recombination procedure and a mutation procedure on the plurality of first individuals to generate a plurality of offspring individuals; and deleting at least one of the plurality of offspring individuals to proceed a next iteration according to a plurality of conditions.

14. The charge-discharge system according to claim 13, wherein the step of performing the initialization to generate the plurality of individuals comprises:

generating a plurality of combinations for the plurality of electric vehicles; and determining the plurality of charge-discharge operations of the plurality of electric vehicles on the corresponding charge-discharge devices at the plurality of time intervals according to a corresponding vehicle order, for each of the plurality of combinations, wherein each of the plurality of electric vehicles is in first order in one of the plurality of combinations.

15. The charge-discharge system according to claim 11, wherein the plurality of vehicle information further comprises an arrival time, and the step of establishing the fitness function according to the plurality of vehicle information and the plurality of system information comprises:

calculating a charge amount according to the state of charging of the plurality of electric vehicles at a corresponding arrival time and the state of charging of the plurality of charge-discharge operations at the plurality of time intervals;

calculating a demand electric power according to the state of charging, an expected departure power, and a battery capacity of the plurality of electric vehicles at the corresponding arrival time;

calculating a satisfaction according to the charge amount and the demand electric power;

adding up the plurality of profits at the plurality of time intervals to obtain a total profit; and establishing the fitness function according to the satisfaction and the total profit.

16. The charge-discharge system according to claim 15, wherein the step of establishing the fitness function according to the plurality of vehicle information and the plurality of system information further comprises:

setting the fitness function to a first fitness function at least one of previous time interval of the plurality of time intervals if a profit per unit of electric power under a grid-to-vehicle transmission pattern increases over time and the total power capacity decreases over time, and setting the fitness function to a second fitness function at rest time intervals of the plurality of time intervals, wherein the first fitness function comprises a motivation factor more than the second fitness function.

17. The charge-discharge system according to claim 15, wherein the fitness function comprises a first penalty factor, and the plurality of steps further comprise:

setting the first penalty factor to reduce the calculated fitness according to the fitness function if the charge-discharge operation of one of the plurality of electric vehicles at least one of last time intervals of the plurality of time intervals is discharging.

18. The charge-discharge system according to claim 17, wherein the fitness function comprises a second penalty factor, and the plurality of steps further comprise:

setting the second penalty factor to reduce the calculated fitness according to the fitness function if the state of charging of one of the plurality of electric vehicles at the departure time is lower than the state of charging at the arrival time.

19. The charge-discharge system according to claim 15, wherein the total profit further comprises an importance, and the plurality of steps further comprise:

setting the importance to decrease monotonically with a stay time of the plurality of electric vehicles in the charge-discharge system.

20. The charge-discharge system according to claim 15, wherein the total profit further comprises a weight, and the plurality of steps further comprise:

setting the weight to a constant when the grid-to-vehicle profit is calculated;

setting the weight to be positively related to a difference value between a profit per unit of electric power under a vehicle-to-grid transmission pattern and a profit per unit of electric power under a grid-to-vehicle transmission pattern when the vehicle-to-grid profit is calculated; and setting the weight to be positively related to the profit per unit of electric power under the vehicle-to-grid transmission pattern when the vehicle-to-vehicle profit is calculated.

\* \* \* \* \*